United States Patent
Delker et al.

(10) Patent No.: US 9,442,709 B1
(45) Date of Patent: Sep. 13, 2016

(54) TRANSITION EXPERIENCE DURING LOADING AND UPDATING AN INTERFACE AND APPLICATIONS PACK

(71) Applicant: Sprint Communications Company L.P., Overland Park, KS (US)

(72) Inventors: Jason R. Delker, Olathe, KS (US); M. Jeffrey Stone, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 101 days.

(21) Appl. No.: 13/659,889

(22) Filed: Oct. 24, 2012

(51) Int. Cl.
*G06F 9/445* (2006.01)

(52) U.S. Cl.
CPC .. *G06F 8/61* (2013.01); *G06F 8/60* (2013.01)

(58) Field of Classification Search
CPC .............. G06F 8/60; G06F 8/61; G06F 8/63; G06F 29/08981; G06F 9/441; G06F 9/44505; G06F 9/01
USPC .......................................................... 717/178
See application file for complete search history.

(56) References Cited

U.S. PATENT DOCUMENTS

| | | | |
|---|---|---|---|
| 5,950,200 A | 9/1999 | Sudai et al. | |
| 6,064,975 A | 5/2000 | Moon et al. | |
| 6,186,553 B1 | 2/2001 | Phillips et al. | |
| 6,356,838 B1 | 3/2002 | Paul | |
| 6,441,831 B1 | 8/2002 | Abramowitz et al. | |
| 6,622,016 B1 | 9/2003 | Sladek et al. | |
| 6,647,260 B2 | 11/2003 | Dusse et al. | |
| 6,882,290 B2 | 4/2005 | French et al. | |
| 6,978,132 B1 | 12/2005 | Sladek et al. | |
| 6,986,107 B2 | 1/2006 | Hanggie et al. | |
| 7,031,437 B1 | 4/2006 | Parsons et al. | |
| 7,046,998 B2 | 5/2006 | Verma et al. | |
| 7,072,653 B1 | 7/2006 | Sladek et al. | |
| 7,073,130 B2 | 7/2006 | Novak et al. | |
| 7,215,754 B1 | 5/2007 | Woodson et al. | |
| 7,260,382 B1 | 8/2007 | Lamb et al. | |

(Continued)

FOREIGN PATENT DOCUMENTS

| | | |
|---|---|---|
| WO | 2009056148 A1 | 5/2009 |
| WO | 2014022446 A1 | 2/2014 |

OTHER PUBLICATIONS

Notice of Allowance dated Jun. 4, 2013, U.S. Appl. No. 13/023,486, filed Feb. 8, 2011.

(Continued)

*Primary Examiner* — Hang Pan
*Assistant Examiner* — Hui-Wen Lin

(57) ABSTRACT

A processor-implemented method is provided. The method comprises transmitting a core portion of an interface and applications pack (IAP) to a mobile device via a wireless network, wherein the (IAP) comprises at least one of a media file, an application, a web widget, and a network service, wherein the IAP is used to customize the communication experience of using the mobile device, and wherein the core portion of the IAP comprises a self-installation routine that provides a user interface and enables core communication functionality of the mobile device. The method also comprises transmitting at least one features portion of the IAP to the mobile device via the wireless network after transmitting the core portion of the IAP, wherein the at least one features portion of the IAP comprises instructions executable by a processor for providing additional functionality to the mobile device.

15 Claims, 8 Drawing Sheets

(56) References Cited

U.S. PATENT DOCUMENTS

| | | |
|---|---|---|
| 7,260,386 B1 | 8/2007 | Haldar et al. |
| 7,409,208 B1 | 8/2008 | Clare et al. |
| 7,500,198 B2 | 3/2009 | Mathews et al. |
| 7,552,432 B2 | 6/2009 | Aiba |
| 7,558,953 B2 | 7/2009 | Osthoff et al. |
| 7,681,134 B1 | 3/2010 | Grechishkin et al. |
| 7,702,322 B1 | 4/2010 | Maurya et al. |
| 7,788,593 B1 | 8/2010 | Grechishkin et al. |
| 7,930,636 B2 | 4/2011 | Garbow et al. |
| 7,970,386 B2 | 6/2011 | Bhat et al. |
| 8,012,219 B2 | 9/2011 | Mendez et al. |
| 8,150,962 B1 | 4/2012 | Wolter |
| 8,244,277 B1 | 8/2012 | Cha et al. |
| 8,265,658 B2 | 9/2012 | Issa et al. |
| 8,270,310 B2 | 9/2012 | Raleigh |
| 8,270,941 B2 | 9/2012 | Kenagy et al. |
| 8,315,198 B2 | 11/2012 | Corneille et al. |
| 8,359,016 B2 | 1/2013 | Lindeman et al. |
| 8,468,164 B1 | 6/2013 | Paleja et al. |
| 8,533,605 B1 | 9/2013 | Cha et al. |
| 8,538,398 B2 | 9/2013 | Wilson et al. |
| 8,559,933 B1 | 10/2013 | Delker et al. |
| 8,577,334 B1 | 11/2013 | Smith et al. |
| 8,577,737 B1 | 11/2013 | Amacker et al. |
| 8,583,091 B1 | 11/2013 | Delker et al. |
| 8,589,911 B1* | 11/2013 | Sharkey et al. ............. 717/173 |
| 8,650,096 B2 | 2/2014 | Van Buskirk et al. |
| 8,819,639 B2 | 8/2014 | Schumacher |
| 8,838,087 B1 | 9/2014 | Delker et al. |
| 8,843,122 B1 | 9/2014 | Wick et al. |
| 8,863,232 B1 | 10/2014 | Tidd |
| 8,954,041 B1 | 2/2015 | Delker et al. |
| 8,972,592 B1 | 3/2015 | Delker et al. |
| 9,043,446 B1 | 5/2015 | Davis et al. |
| 9,123,062 B1 | 9/2015 | Delker et al. |
| 9,189,607 B1 | 11/2015 | Wick et al. |
| 2002/0029169 A1 | 3/2002 | Oki et al. |
| 2002/0054086 A1 | 5/2002 | Van Oostenbrugge et al. |
| 2002/0054150 A1 | 5/2002 | I'Anson et al. |
| 2002/0101444 A1 | 8/2002 | Novak et al. |
| 2002/0123335 A1 | 9/2002 | Luna et al. |
| 2002/0142760 A1 | 10/2002 | Gidron et al. |
| 2002/0167542 A1 | 11/2002 | Florin |
| 2003/0233329 A1 | 12/2003 | Laraki et al. |
| 2004/0044752 A1 | 3/2004 | Hamaguchi et al. |
| 2004/0113940 A1 | 6/2004 | Brockway et al. |
| 2004/0148598 A1 | 7/2004 | Kita et al. |
| 2004/0171375 A1 | 9/2004 | Chow-Toun |
| 2004/0179034 A1 | 9/2004 | Burritt |
| 2004/0181678 A1 | 9/2004 | Lee et al. |
| 2004/0203941 A1 | 10/2004 | Kaplan et al. |
| 2004/0216054 A1 | 10/2004 | Mathews et al. |
| 2005/0050474 A1 | 3/2005 | Bells et al. |
| 2005/0055696 A1 | 3/2005 | Betzler et al. |
| 2005/0071780 A1 | 3/2005 | Muller et al. |
| 2005/0085272 A1 | 4/2005 | Anderson et al. |
| 2006/0048141 A1 | 3/2006 | Persson et al. |
| 2006/0085751 A1 | 4/2006 | O'Brien et al. |
| 2006/0092861 A1 | 5/2006 | Corday et al. |
| 2006/0150256 A1 | 7/2006 | Fanton et al. |
| 2006/0190569 A1 | 8/2006 | Neil et al. |
| 2006/0235760 A1 | 10/2006 | Sanjar et al. |
| 2006/0258289 A1 | 11/2006 | Dua |
| 2006/0277469 A1 | 12/2006 | Chaudhri et al. |
| 2007/0067738 A1 | 3/2007 | Flynt et al. |
| 2007/0088851 A1 | 4/2007 | Levkovitz et al. |
| 2007/0109580 A1* | 5/2007 | Yoshida ..................... 358/1.13 |
| 2007/0130156 A1* | 6/2007 | Tenhunen et al. ............ 707/10 |
| 2007/0265023 A1 | 11/2007 | Bengtsson et al. |
| 2007/0268842 A1 | 11/2007 | Wang |
| 2007/0282914 A1 | 12/2007 | Sivapragasam et al. |
| 2008/0010133 A1 | 1/2008 | Pyhalammi et al. |
| 2008/0034309 A1 | 2/2008 | Louch et al. |
| 2008/0092057 A1 | 4/2008 | Monson et al. |
| 2008/0192714 A1 | 8/2008 | Kim et al. |
| 2008/0214172 A1 | 9/2008 | Anwer |
| 2008/0276182 A1 | 11/2008 | Leow |
| 2008/0305775 A1 | 12/2008 | Aaltonen et al. |
| 2008/0319887 A1 | 12/2008 | Pizzi et al. |
| 2009/0017870 A1 | 1/2009 | An |
| 2009/0077495 A1 | 3/2009 | Bhat et al. |
| 2009/0181716 A1 | 7/2009 | Benco et al. |
| 2009/0186651 A1 | 7/2009 | You |
| 2009/0228824 A1 | 9/2009 | Forstall et al. |
| 2009/0254753 A1 | 10/2009 | De Atley et al. |
| 2009/0260004 A1* | 10/2009 | Datta et al. ................. 717/175 |
| 2009/0288079 A1 | 11/2009 | Zuber et al. |
| 2009/0291674 A1* | 11/2009 | Choi ........................ 455/414.3 |
| 2009/0307679 A1 | 12/2009 | Lee et al. |
| 2010/0005196 A1 | 1/2010 | Wolff-Petersen |
| 2010/0030901 A1 | 2/2010 | Hallberg et al. |
| 2010/0037204 A1 | 2/2010 | Lin et al. |
| 2010/0058431 A1 | 3/2010 | McCorkendale et al. |
| 2010/0060549 A1 | 3/2010 | Tsern |
| 2010/0087175 A1 | 4/2010 | Roundtree |
| 2010/0115438 A1 | 5/2010 | Chu |
| 2010/0121567 A1* | 5/2010 | Mendelson .......... G01C 21/206 701/467 |
| 2010/0184422 A1 | 7/2010 | Ahrens |
| 2010/0190478 A1 | 7/2010 | Brewer et al. |
| 2010/0197219 A1 | 8/2010 | Issa et al. |
| 2010/0234051 A1 | 9/2010 | Holden et al. |
| 2010/0269107 A1 | 10/2010 | Jung et al. |
| 2010/0281427 A1 | 11/2010 | Ghosh et al. |
| 2011/0034160 A1 | 2/2011 | Corda et al. |
| 2011/0072121 A1 | 3/2011 | Takasugi et al. |
| 2011/0161149 A1 | 6/2011 | Kaplan |
| 2011/0161484 A1 | 6/2011 | Van den Bogaert et al. |
| 2011/0210933 A1 | 9/2011 | Forstall |
| 2011/0238496 A1 | 9/2011 | Gurbuxani et al. |
| 2011/0258301 A1 | 10/2011 | McCormick et al. |
| 2011/0295980 A1 | 12/2011 | Aldis et al. |
| 2011/0312387 A1 | 12/2011 | Heo et al. |
| 2011/0314389 A1 | 12/2011 | Meredith et al. |
| 2012/0016735 A1 | 1/2012 | Park et al. |
| 2012/0054022 A1 | 3/2012 | Kosashvili |
| 2012/0072311 A1 | 3/2012 | Khan |
| 2012/0102428 A1 | 4/2012 | Stewart |
| 2012/0102547 A1 | 4/2012 | Fransdonk |
| 2012/0117478 A1 | 5/2012 | Vadde et al. |
| 2012/0155292 A1 | 6/2012 | Zazula et al. |
| 2013/0097654 A1* | 4/2013 | Aciicmez et al. ................ 726/1 |
| 2013/0275915 A1* | 10/2013 | Wang .......................... 715/810 |
| 2013/0294307 A1 | 11/2013 | Johansson et al. |
| 2014/0036697 A1 | 2/2014 | Annan et al. |
| 2014/0047559 A1 | 2/2014 | Vera et al. |
| 2014/0127662 A1 | 5/2014 | Kron et al. |
| 2014/0173462 A1 | 6/2014 | Mattingly et al. |
| 2014/0298320 A1 | 10/2014 | Xu et al. |

OTHER PUBLICATIONS

Advisory Action dated Apr. 23, 2013, U.S. Appl. No. 12/876,221, filed Sep. 6, 2010.

Notice of Allowance dated Jul. 2, 2013, U.S. Appl. No. 12/876,221, filed Sep. 6, 2010.

Final Office Action dated May 10, 2013 U.S. Appl. No. 13/018,083, filed Jan. 31, 2011.

First Action Interview Office Action dated May 6, 2013, U.S. Appl. No. 13/118,058, filed May 27, 2011.

Notice of Allowance dated Apr. 29, 2013, U.S. Appl. No. 13/537,563, filed on Jun. 29, 2012.

Notice of Allowance dated Jun. 27, 2013, U.S. Appl. No. 13/161,496, filed Jun. 16, 2011.

FAIPP Office Action dated Jan. 24, 2014, U.S. Appl. No. 12/876,220, filed Sep. 6, 2010.

Office Action dated Dec. 26, 2013, U.S. Appl. No. 13/018,083, filed Jan. 31, 2011.

Advisory Action dated Nov. 22, 2013, U.S. Appl. No. 13/118,058, filed May 27, 2011.

Office Action dated Dec. 17, 2013, U.S. Appl. No. 13/031,123, filed Feb. 18, 2011.

(56) References Cited

OTHER PUBLICATIONS

Final Office Action dated Mar. 20, 2014, U.S. Appl. No. 12/876,220, filed Sep. 6, 2010.
Notice of Allowance dated May 6, 2014, U.S. Appl. No. 12/876,220, filed on Sep. 6, 2010.
Pre-Interview Communication dated Mar. 28, 2014, U.S. Appl. No. 14/019,053, filed Sep. 5, 2013.
Final Office Action dated Apr. 3, 2014, U.S. Appl. No. 13/018,083, filed Jan. 31, 2011.
Advisory Action dated Jun. 9, 2014, U.S. Appl. No. 13/018,083, filed Jan. 31, 2011.
Office Action dated Mar. 18, 2014, U.S. Appl. No. 13/118,058, filed May 27, 2011.
Pre-Interview Communication dated Jun. 9, 2014, U.S. Appl. No. 13/271,207, filed Oct. 11, 2011.
Pre-Interview Communication dated Mar. 21, 2014, U.S. Appl. No. 13/537,610, filed Jun. 29, 2012.
Notice of Allowance dated May 18, 2014, U.S. Appl. No. 13/537,610, filed Jun. 29, 2012.
Wick, Ryan A., et al., Patent Application entitled "Mobile Phone Controls Preprocessor" filed Jun. 29, 2012, U.S. Appl. No. 13/537,610.
Ackerman, Samuel K., "Lecture Slides: Mapping User Interface Design to Culture Dimensions", Aaron Marcus and Associates, Inc., 2001.
Hollister, Sean, "Apple patent app hints at iPod-based phones, Peel 520 turns shades of green, red, blue and yellow," Engadget, http://www.engadget.com/2010/09/19/apple-patent-app-hints-at-ipod-based-phones-peel-520-turns-shad!, Sep. 19, 2010, p. 1.
Kenja's Newsletter, About Newsletter, http://kenja.net/news.main.html, printed from the World Wide Web, "last modified Fri, Oct. 10, 2003".
Openwave, "Comparison of WAP Push and Short Message Service (SMS)," Openwave Systems, Inc., Redwood City, CA, Apr. 2002.
QUALCOMM, uiOne™, http://brew.qualcomm.com/brew/in/about/uione.html.
Scansoft press release, "Scansoft Launches SpeechPAK Healthcare Suite 2.0", http://dragontranscription.com/press-releases-articles-february-2005/scansoft-launches-speechpak-healthcare-suite-2.0.html, Feb. 17, 2005.
Stanford Technology Ventures Program, "Danger, Inc.: Powering the Next Generation of Mobile Technology", Oct. 15, 2003.
Pre-Interview Communication dated Apr. 24, 2012, U.S. Appl. No. 12/876,220, filed Sep. 6, 2010.
Pre-Interview Communication dated Feb. 26, 2013, U.S. Appl. No. 13/023,486, filed Feb. 8, 2011.
Office Action — Restriction Requirement dated Feb. 1, 2012, U.S. Appl. No. 12/876,221, filed Sep. 6, 2010.
Office Action dated May 10, 2012, U.S. Appl. No. 12/876,221, filed Sep. 6, 2010.
Final Office Action dated Jan. 11, 2013, U.S. Appl. No. 12/876,221, filed Sep. 6, 2010.
Pre-Interview Communication dated Jul. 19, 2012, U.S. Appl. No. 13/018,083, filed Jan. 31, 2011.
Pre-Interview Communication dated Feb. 26, 2013, U.S. Appl. No. 13/118,058, filed May 27, 2011.
Notice of Allowance dated Mar. 30, 2012, U.S. Appl. No. 13/029,103, filed Feb. 16, 2011.
Office Action dated Mar. 14, 2013, U.S. Appl. No. 13/161,496, filed Jun. 16, 2011.
Office Action dated Apr. 15, 2008, U.S. Appl. No. 11/046,083, filed Jan. 28, 2005.
Final Office Action dated Oct. 28, 2008, U.S. Appl. No. 11/046,083, filed Jan. 28, 2005.
Office Action dated Aug. 15, 2011, U.S. Appl. No. 12/330,759, filed Dec. 9, 2008.
Office Action dated Apr. 3, 2008, U.S. Appl. No. 11/333,964, filed Jan. 17, 2006.
Final Office Action dated Oct. 8, 2008, U.S. Appl. No. 11/333,964, filed Jan. 17, 2006.
Final Office Action dated Jan. 21, 2009, U.S. Appl. No. 11/333,964, filed Jan. 17, 2006.
Advisory Action dated Apr. 13, 2009, U.S. Appl. No. 11/333,964, filed Jan. 17, 2006.
Office Action dated Jun. 23, 2009, U.S. Appl. No. 11/333,964, filed Jan. 17, 2006.
Final Office Action dated May 11, 2010, U.S. Appl. No. 11/333,964, filed Jan. 17, 2006.
Advisory Action dated Jul. 22, 2010, U.S. Appl. No. 11/333,964, filed Jan. 17, 2006.
Wolter, Eric, Patent Application entitled "Method and System for Calendar-Based Delivery of Themed User-Interface Skins," filed Dec. 9, 2008, U.S. Appl. No. 12/330,759.
Wolter, Eric S., Patent Application entitled "Method and System for Delivery of User-Interface Skins, Applications, and Services to Wireless Devices," filed Jan. 17, 2006, U.S. Appl. No. 11/333,964.
Delker, Jason R., et al., Patent Application entitled "Provisioning System and Methods for Interfaceless Phone," filed Sep. 6, 2010, U.S. Appl. No. 12/876,220.
Delker, Jason R., et al., Patent Application entitled "System and Method for ID Platform," filed Feb. 8, 2011, U.S. Appl. No. 13/023,486.
Delker, Jason R., et al., Patent Application entitled "Dynamic Loading, Unloading, and Caching of Alternate Complete Interfaces," filed Sep. 6, 2010, U.S. Appl. No. 12/876,221.
Delker, Jason R., et al., Patent Application entitled "Shared ID with Second Party," filed Jan. 31, 2011, U.S. Appl. No. 13/018,083.
Delker, Jason R., et al., Patent Application entitled "Extending ID to a Computer System," filed May 27, 2011, U.S. Appl. No. 13/118,058.
Davis, John M., et al., Patent Application entitled "Mirroring Device Interface Components for Content Sharing," filed Mar. 10, 2011, U.S. Appl. No. 13/045,292.
Annan, Brandon C., et al., Patent Application entitled, "Traffic Management of Third Party Applications", filed Jul. 31, 2012, U.S. Appl. No. 13/536,709.
Cha, Tae-Woo, et al., Patent Application entitled "Device Experience Adaptation Based on Schedules and Events," filed Feb. 16, 2011, U.S. Appl. No. 13/029,103.
Cha, Tae-Woo, et al., Patent Application entitled "Device Experience Adaptation Based on Schedules and Events," filed Jun. 29, 2012, U.S. Appl. No. 13/537,563.
Smith, Nathan A., et al., Patent Application entitled "Restricted Testing Access for Electronic Device," filed Jun. 16, 2011, U.S. Appl. No. 13/161,496.
Katzer, Robin Dale, et al., Patent Application entitled "Zone Architecture for Dynamic Targeted Content Creation," filed Oct. 11, 2011, U.S. Appl. No. 13/271,207.
Delker, Jason R., et al., Patent Application entitled "Ad Sponsored Communication Pack," filed Feb. 18, 2011, U.S. Appl. No. 13/031,123.
Foreign Communication From a Related Counterpart Application—International Search Report and Written Opinion, PCT/US2013/052805 Oct. 4, 2013.
Advisory Action dated Aug. 6, 2013, U.S. Appl. No. 13/018,083, filed Jan. 31, 2011.
Final Office Action dated Sep. 10, 2013, U.S. Appl. No. 13/118,058, filed May 27, 2011.
Office Action—Restriction Requirement dated Aug. 26, 2013, U.S. Appl. No. 13/031,123, filed Feb. 8, 2011.
Delker, Jason R., et al., Patent Application entitled "System and Method for ID Platform," filed Sep. 5, 2013, U.S. Appl. No. 14/019,053.
Delker, Jason R., et al., Patent Application entitled "Dynamic Loading, Unloading, and Caching of Alternate Complete Interfaces," filed Sep. 30, 2013, U.S. Appl. No. 14/042,707.
Annan, Brandon C., et al., International Application entitled, "Traffic Management of Third Party Applications", filed Jul. 24, 2013, Serial No. PCT/US13/52805.
Foreign Communication From a Related Counterpart Application—International Preliminary Report on Patentability dated Feb. 12, 2015, PCT/US2013/052805 filed on Jul. 24, 2013.

(56) References Cited

OTHER PUBLICATIONS

Supplemental Notice of Allowance dated Dec. 3, 2014, U.S. Appl. No. 13/118,058, filed May 27, 2011.
Notice of Allowance dated Jan. 6, 2015, U.S. Appl. No. 13/045,292, filed Mar. 10, 2011.
Office Action dated Dec. 17, 2014, U.S. Appl. No. 13/563,709, filed Jul. 31, 2012.
FAIPP Office Action dated Dec. 2, 2014, U.S. Appl. No. 13/271,207, filed Oct. 11, 2011.
Notice of Allowance dated Aug. 13, 2014, U.S. Appl. No. 14/019,053, filed Sep. 5, 2013.
Office Action dated Sep. 23, 2014, U.S. Appl. No. 13/018,083, filed Jan. 31, 2011.
Notice of Allowance dated Oct. 22, 2014, U.S. Appl. No. 13/118,058, filed May 27, 2011.
Pre-Interview Communication dated Aug. 6, 2014, U.S. Appl. No. 13/045,292, filed Mar. 10, 2011.
First Action Interview Office Action dated Oct. 10, 2014, U.S. Appl. No. 13/045,292, filed Mar. 10, 2011.
Office Action dated Oct. 10, 2014, U.S. Appl. No. 13/031,123, filed Feb. 18, 2011.
Wick, Ryan A., et al., Patent Application entitled "Mobile Phone Controls Preprocessor" filed Sep. 3, 2014, U.S. Appl. No. 14/476,339.
Notice of Allowance dated Apr. 22, 2015, U.S. Appl. No. 13/031,123, filed Feb. 18, 2011.
Schwermann, Nathan M., et al., entitled "Methods for Customization of Default Applications on a Mobile Communication Device," filed Apr. 30, 2015, U.S. Appl. No. 14/701,156.
Final Office Action dated Jun. 23, 2015, U.S. Appl. No. 13/563,709, filed Jul. 31, 2012.
Final Office Action dated Jun. 4, 2015, U.S. Appl. No. 13/271,207, filed Oct. 11, 2011.
Pre-Interview Communication dated Jun. 8, 2015, U.S. Appl. No. 14/476,339, filed Sep. 3, 2014.
Notice of Allowance dated Jul. 16, 2015, U.S. Appl. No. 14/476,339, filed Sep. 3, 2014.
FAIPP Pre-Interview Communication dated Jul. 24, 2015, U.S. Appl. No. 14/168,007, filed Jan. 30, 2014.
Fultz, David K., et al., "Virtual Preloads," filed Jan. 30, 2014, U.S. Appl. No. 14/168,007.
Pre-Interview Communication dated Dec. 1, 2015, U.S. Appl. No. 14/042,707, filed Sep. 30, 2013.
Notice of Allowance dated Feb. 8, 2016, U.S. Appl. No. 14/042,707, filed Sep. 30, 2013.
Advisory Action dated Jan. 29, 2016, U.S. Appl. No. 13/563,709, filed Jul. 31, 2012.
Final Office Action dated Jan. 28, 2016, U.S. Appl. No. 14/168,007, filed Jan. 30, 2014.
Final Office Action dated Feb. 8, 2016, U.S. Appl. No. 14/701,156, filed Apr. 30, 2015.
Office Action dated Sep. 15, 2015, U.S. Appl. No. 13/563,709, filed Jul. 31, 2012.
Advisory Action dated Oct. 29, 2015, U.S. Appl. No. 13/271,207, filed Oct. 11, 2011.
Office Action dated Oct. 1, 2015, U.S. Appl. No. 14/701,156, filed Apr. 30, 2015.
Notice of Allowance dated Mar. 1, 2016, U.S. Appl. No. 13/563,709, filed Jul. 31, 2012.
Office Action dated Mar. 14, 2016, U.S. Appl. No. 13/271,207, filed Oct. 11, 2011.
Advisory Action dated Mar. 29, 2016, U.S. Appl. No. 14/168,007, filed Jan. 30, 2014.
Office Action dated Apr. 14, 2016, U.S. Appl. No. 14/168,007, filed Jan. 30, 2014.
Advisory Action dated Apr. 15, 2016, U.S. Appl. No. 14/701,156, filed Apr. 30, 2015.

* cited by examiner

TRANSITION EXPERIENCE DURING LOADING AND UPDATING AN INTERFACE AND APPLICATIONS PACK

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

An effective user interface for a mobile device may be readily understood and provide the user a sense of comfort and control. Users may see the range of their choices, understand how to accomplish their objectives, and complete their tasks. The user interface may relieve the user from performing trivial tasks. Work done by the device may be continuously saved, with a full option for the user to undo any activity at any time. A well designed user interface may feature applications and services that perform an increased quantity of work, while requiring a reduced quantity of input from the user. Interface applications may attempt to anticipate the wants and needs of the user. The user may be relieved of tasks comprising searching for or gathering information or locating tools. A well designed interface may deliver the information and tools needed for each step of the process to the user. The interface and its applications may speak the users' language, with familiar phrases and words, instead of terms oriented to the system of the device or complicated technology details. Information presented by the interface appears in a natural and logical order. Information that is less relevant or rarely needed may not be presented in dialogue boxes or messages to the user.

SUMMARY

In an embodiment, a processor-implemented method is provided. The method comprises transmitting a core portion of an interface and applications pack (IAP) to a mobile device via a wireless network, wherein the (IAP) comprises at least one of a media file, an application, a web widget, and a network service, wherein the IAP is used to customize the communication experience of using the mobile device, and wherein the core portion of the IAP comprises a self-installation routine that provides a user interface to be presented to a user of the mobile device and enables core communication functionality of the mobile device. The method also comprises transmitting at least one features portion of the IAP to the mobile device via the wireless network after transmitting the core portion of the IAP, wherein the at least one features portion of the IAP comprises instructions executable by a processor for providing additional functionality to the mobile device.

In an embodiment, a processor-implemented method is provided. The method comprises receiving an initial core bundle of an interface and applications pack (IAP) from a provider via a wireless network, wherein the initial core bundle of the IAP comprises a file providing a user interface frame, identification of materials that are to be provided to the mobile device, and access to core functionalities, wherein the initial portion of the IAP comprises only a portion of the IAP. The method also comprises installing the initial core bundle of the IAP to the mobile device. The method also comprises generating with a processor and displaying on a display an interface from the initial core bundle. The method also comprises receiving additional bundles of the IAP from the provider via the wireless network. The method also comprises installing the additional bundles of the IAP. The method also comprises modifying with a processor the interface to reflect the installation of additional materials, wherein the displaying on the display the interface from the initial core bundle is performed before the installation of the additional bundles of the IAP is complete.

A mobile device is provided. The mobile device comprises a display and a processor coupled to the display and configured to generate a user interface displayable on the display, wherein the user interface comprises a plurality of icons, wherein each icon corresponds to an application or a service, wherein an available one of the plurality of icons comprises a viewable indicia indicating that an application or service corresponding to the available one of the plurality of icons is currently available for use by the mobile device, wherein an available one of the plurality of icons that has been used less than a threshold amount comprises a viewable indicia indicating that an application or service corresponding to the available one of the plurality of icons is currently available for use by the mobile device and has been used less than a threshold amount, and wherein an unavailable one of the plurality of icons comprises a viewable indicia indicating that an application or service corresponding to the unavailable one of the plurality of icons is currently being downloaded to the mobile device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
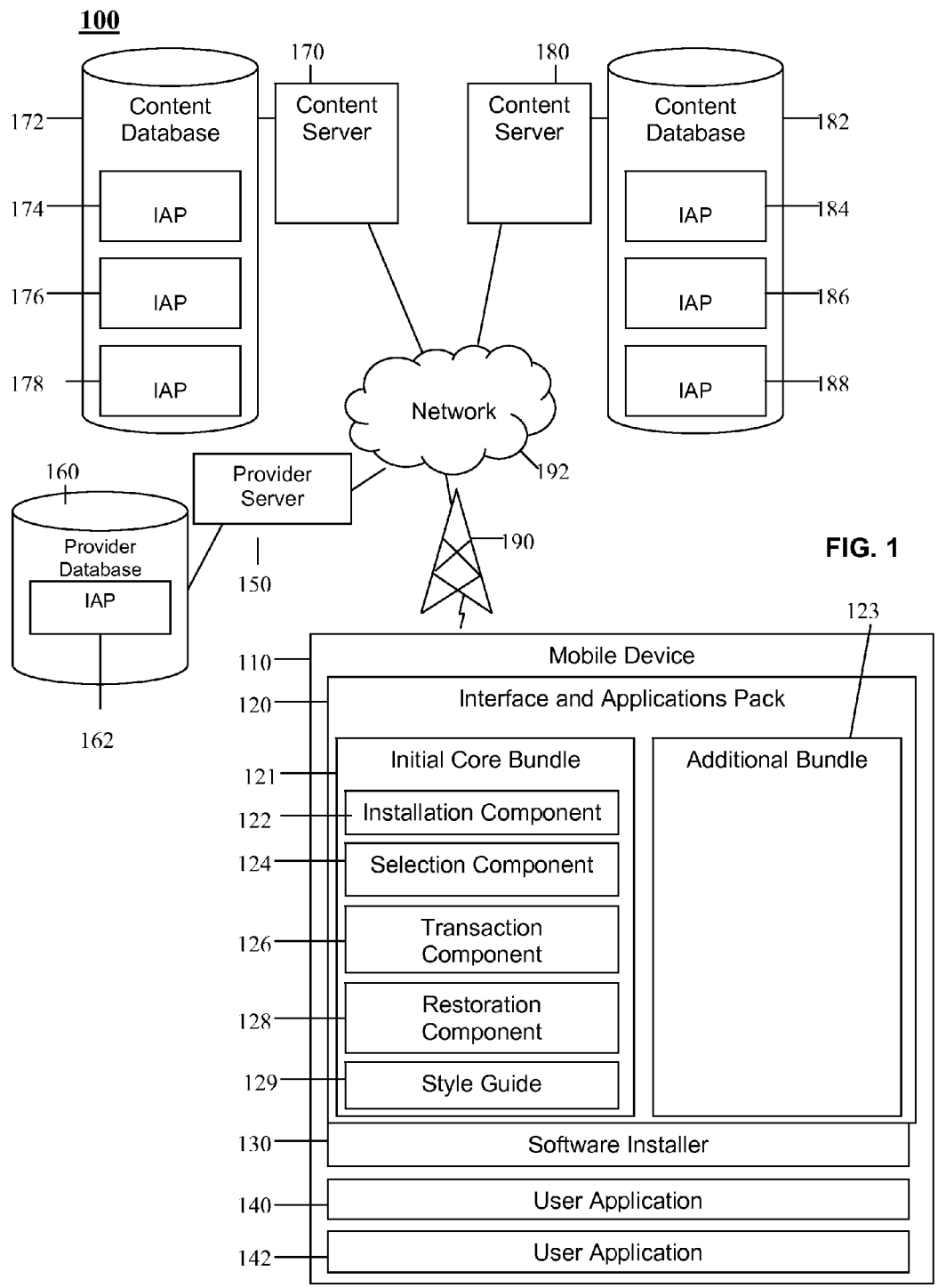
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure provides systems and methods promoting a mobile device to load, unload, cache, and reload packaged bundles of applications, content, themes, and/or network applications that comprise at least a portion of a user interface for the device. The packaged bundle may be referred to as an Interface and Applications Pack (IAP). In an embodiment, to promote efficient downloading and improve the user experience, the IAP may be divided into a plurality of bundles with an initial core bundle comprising a small initial file that may provide a frame (e.g., a user interface) and identification of materials that are "in-flight" and yet to be downloaded as well as access to core firmware mobile device functionalities. In an embodiment, the initial core bundle may be downloaded in seconds and provides the final frame and view of items that are still in the process of being sent to or downloaded to the mobile device. In an embodiment, the initial core bundle may provide early access and uses onscreen highlighting or otherwise indicating applications that have not yet fully downloaded, applications ready but that have not yet been tried, applications that are ready but have not been tried very much, and no highlighting on applications installed and used by the user. The downloading and installing of the initial core bundle may provide core communication functionality (e.g., immediate access to making and receiving phone calls, immediate access to creating, sending, and receiving text messages, etc. or some subset of these functions) and may avoid the potentially significant download delays (e.g., the initial core bundle may be downloaded and installed within a few seconds, while the entire IAP may take several minutes to download and install) before start-up that may be experienced by downloading the entire IAP as a single bundle. The initial core bundle may present or provide a control associated with an application that has not yet been downloaded. The control may be presented in a manner to indicate that the associated application is not yet available for use or that all of the functionality of the associated application is not fully available. The initial core bundle may encourage testing or trial of new applications provided with the IAP by, for example, indicating whether an application has been tried or tried only infrequently.

An IAP comprises at least one of a media file, an application, a web widget, and a network service and may be used to customize the communication experience of using an electronic device. In an embodiment, the IAP comprises at least two of these enumerated elements. In another embodiment, the IAP comprises at least three of these enumerated elements. An IAP may be viewed as an aggregated set of applications, web widgets, network services, ring tones, ringback tones, alerting tones, wallpapers, interface controls, and other content targeted for the electronic device. In some contexts, the IAP may be referred to as an ID pack.

As an example, but not by way of limitation, an IAP may be produced by an enterprise such as a retail outlet or a media business to promote its business interests to wireless communication service subscribers. The IAP, when active on an electronic device, may provide a control to select a store mapping web widget that provides a map of the location of products within a retail store, where the map of the store is dynamically downloaded by the web widget based on a physical location of the electronic device and based on known locations of the retail stores operated by the enterprise. The map web widget may provide a control to select a search utility for finding the location of a specific product within a store.

The IAP may provide an application that automatically generates an electronic coupon and posts a notification about the coupon in a notifications display area of the electronic device. The application may generate the coupon and post the related notification based on determining that the physical location of the electronic device is in the proximity of a known retail store operated by the enterprise. Alternatively, the application may generate the coupon based on the passage of a period of time without the subscriber of the electronic device making a purchase from the enterprise and based on the day of the week, for example a Saturday when the subscriber of the electronic device has most often made purchases from the enterprise in the past. In an embodiment, the application may determine when the electronic device is in a retail store operated by the enterprise, establish a communication link with a corresponding application executing on a server in the retail store, and receive information about purchases made by the subscriber of the electronic device. This purchase information may be used in the process of generating coupons described above.

The IAP may provide controls to access a network application that promotes participation in relevant social media, for example to participate in a home improvement discussion forum sponsored by the subject retail store, to post photographs of home improvement projects the user has completed, and to post descriptions of the materials used and/or innovations applied to overcome peculiar problems. The IAP may provide controls to select videos posted to the home improvement social media site, for example video showing fundamental techniques of using tools.

The IAP may provide media files that define wall papers and themes that change the look and sounds of the electronic device. For example, the IAP may include an audio file that defines an aural alert associated with receiving a short message service (SMS) message that is the sound of hammering. For example, the IAP may include a picture file that defines the background of the display of the electronic device to be a photographic view of picturesque mountains seen through a 2×4 frame structure for a storage shed. These examples are provided to suggest the scope and power of the IAP construct, but it is understood that a great variety of implementations of the IAP are contemplated by the present disclosure. The IAP may include alerting tones that are played when selected events occur to alert a user, for example to alert the user that a simple message service (SMS) message has been received or to alert the user to an event or the approach of an event germane to the subject IAP.

The IAP may provide interface controls for selecting functionality provided as part of the IAP as well as for selecting functionality that may be provided by the electronic device independently of the IAP. For example, the IAP may provide a control for invoking an address book widget that is provided by the firmware of the electronic device or for invoking a voice call dialing functionality. Interface controls provided by the IAP that invoke functions provided by the electronic device itself, for example provided in firmware of the electronic device, may be referred to as encapsulated controls. Such encapsulation of controls by the IAP may promote a more complete adaptation of the communication experience.

The IAP further comprises an automatic self-installation routine that provides a user-friendly means to "stand up" the IAP for the electronic device. The self-installation routine may download applications, web widgets, ring tones, wallpapers, and other content to the electronic device. The self-installation routine may include instructions to automatically configure the device's home screens such as shortcuts, bookmarks, and widget placement. In an embodiment, a portion of the self-installation routine may execute partly in the network to provision and/or initialize network services, ringback tones, and other network-provided functionality associated with the IAP. For example, a portion of the self-installation routine may initialize and/or provision voice-mail changes. The portion of the self-installation routine that executes on the electronic device may invoke the portion of the self-installation routine that executes in the network. In an embodiment, a portion of the self-installation routine may be provided by a utility built into the basic firmware or software library of the electronic device and another portion of the self-installation routine may be provided as part of the specific IAP.

The IAP is experienced, at one level of abstraction, as a unity. For example, when a user selects an IAP for installation on the electronic device, the user may perform a single selection action, and the self-installation routine may perform a number of separate and distinct actions to stand-up the selected IAP that are not observed by the user. When the user selects an IAP to be active, a currently active IAP may be deactivated and the various distinct components of the selected IAP may be brought into operation as a single global action, mediated by the automatic self-installation routine. The unity of experience may be further promoted by interactions among the several components of the IAP. For example, selection of controls in a web widget of the IAP may invoke playback of audios stored in media files of the IAP; for example, execution of an application of the IAP may trigger a modification of the wallpaper presented as a backdrop for the display of the electronic device.

An IAP may be tested to assure that the aggregation of media files, applications, web widgets, and network services interact appropriately with each other and do not impair other functionality of the electronic device. The testing may verify that the IAP interoperates with a range of different electronic devices, standard firmware, and/or standard applications. In an embodiment, the service provider may impose a constraint that IAPs are provided to the electronic device from a controlled content source so that the service provider can exercise oversight and quality control of IAPs. For further details about IAPs (e.g. interface and applications packs), see U.S. patent application Ser. No. 12/876,220, filed Sep. 6, 2010, entitled "Provisioning System and Methods for Interfaceless Phone," by Jason R. Delker, et al.; U.S. patent application Ser. No. 13/023,486, filed Feb. 8, 2011, entitled "System and Method for ID Platform," by Jason R. Delker, et al.; U.S. patent application Ser. No. 12/876,221, filed Sep. 6, 2010, entitled "Dynamic Loading, Unloading, and Caching of Alternate Complete Interfaces," by Jason R. Delker, et al.; and U.S. patent application Ser. No. 13/118,058 filed May 27, 2011, entitled "Extending ID to a Computer System," by Jason R. Delker, et al., all of which are incorporated herein by reference in their entirety.

Turning now to FIG. 1, a system 100 of dynamic loading, unloading, and caching of alternate complete IAPs is provided. The system 100 comprises a mobile device 110, an IAP 120, a software installer 130, user applications 140, 142, a content server 170, 180, content databases 172, 182, IAPs 174, 176, 178, 184, 186, 188, a base transceiver station 190, and a network 192. In an embodiment, mobile device 110 may be a mobile phone, a smart phone, or a portable computer. A smart phone may be a mobile device that includes not only the features of a mobile phone, but also additional functionality such as, providing e-mail service, web access, and still picture and video capability via a camera.

The IAP 120 executes on the mobile device 110. Mobile devices 110 are described in detail hereinafter. The IAP 120 has contact with a plurality of content servers 170, 180 and downloads IAPs 174, 176, 178, 184, 186, 188 containing user applications 140, 142. When loaded on the mobile device 110, the user applications 140, 142 become the user interface or user experience for the mobile device 110. Each one of the IAPs 174, 176, 178, 184, 186, 188 provides a complete user interface. For example, one IAP 174 may provide user applications 140, 142 that comprise the complete user interface. The user interface created by the loaded user applications 140, 142 may be permanent or may be temporary. The user interface created from one of the IAPs 174, 176, 178 from one content server 170 may be replaced by a user interface created from another of the IAPs 174, 176, 178 from the same content server 170. The user interface created from one of the IAPs 174, 176, 178 from one content server 170 may alternatively be replaced by a user interface created from one of the IAPs 184, 186, 188 from a different content server 180 and vice versa.

Each of the IAPs 174, 176, 178, 184, 186, 188 may comprise a core bundle and one or more additional bundles. The initial core bundle for each of IAPs 174, 176, 178, 184, 186, 188 may comprise a small initial file in comparison to the entire IAP that may provide a frame (e.g., a user interface) and identification of materials that are "in-flight" and yet to be downloaded as well as provide access to core firmware mobile device functionalities. The core firmware mobile device functionalities may comprise core communication functions. Core communication functions may include one or more of the ability to make and receive telephone calls, immediate access to creating, sending, and receiving text messages, access to and functionality for an instant messaging (IM) application, e-mail access, access to the Internet, etc. In an embodiment, the core communication functions may only include the ability to make and receive telephone calls. In other embodiments, various combinations of features may be available with the core communication functions. For example, in an embodiment, core communication functionality may include the ability to make and receive telephone calls and to create, send, and receive text messages. In another embodiment, the core communication functionality may include the ability to make and receive telephone calls and to have access to the Internet. In another embodiment, core communication functionality may include the ability to make and receive telephone calls, the ability to create, send and receive text messages, and access to the Internet. In an embodiment the ratio of the size of the initial core bundle in comparison to the size of the entire IAP may be in the range from about 1 to 3 to about 1 to 10. For example, the ratio of the size of the initial core bundle in comparison to the size of the entire IAP may be about 1:3; about 1:4; about 1:5; about 1:6; about 1:7; about 1:8; about 1:9; or about 1:10. In an embodiment, the ratio may be greater than 1:10, for example about 1:20 or about 1:30. In an embodiment, core firmware mobile device functionalities may include a dialer, voice mail, a text messaging system, a contacts list, and access to emergency services. However, functionalities that are considered core firmware mobile device functionalities may differ between different IAPs 174, 176, 178, 184, 186, 188. For example, one IAP may include e-mail access as a core functionality, whereas another IAP does not include e-mail access as a core functionality, but may include access to a social networking web site as a core functionality. An IAP that includes e-mail access as a core functionality may be geared more toward business users whereas an IAP that includes access to a social networking web site as part of its core functionality may be geared more toward casual users. The core bundle may be installed and running providing access to core functionalities before the remaining portions of the IAP have been transmitted and/or installed on the mobile device 110.

Complete interfaces for the mobile device 110 comprise the full user experience and may comprise user applications 140, 142 that execute in the viewing area of the mobile device 110. The complete interface also may comprise user applications 140, 142 that are executing but are "in the background" and not visible to the user. The interface may include software items that are accessing services across networks, for example call tones that may be in effect while a user interface associated with a particular retailer, for example, is loaded and executing. Wallpaper, or the background of a graphical user interface or display, may be part of the user interface. The complete interface also may comprise web widgets and links to internet sites that may constantly or intermittently access internet sites. Ring tones and other sounds that may be downloadable in the IAP 174 and loadable on the mobile device 110 also may be components of the complete interface.

While IAP 174 is discussed hereinafter, it is understood that one of the other IAPs 176, 178, 184, 186, 188 alternatively may be used in substantially the same manner as the IAP 174. The IAP 174 available for download from content servers 170, 180 may contain user applications 140, 142 that are precertified by a telecommunications service provider and may load automatically on the mobile device 110 using tested routines. Other IAPs 176, 178, 184, 186, 188 may contain other user applications and/or combinations of user interface items such as widgets, tiles, ring tones, wallpaper, access to network services, and other user interface items. The telecommunications service provider may provide wireless voice and data services to the mobile device 110. The telecommunications service provider may be associated with a provider server 150 and a provider database 160 and may have provided user applications 140, 142 for the loading of the initial user interface after the mobile device 110 was activated upon purchase. The content servers 170, 180 may be associated with entities separate from the telecommunications service provider. The telecommunications service provider may arrange with the operators of the content servers 170, 180 to build customized IAPs 174, 176, 178, 184, 186, 188 containing user applications 140, 142 and/or widgets, tiles, ring tones, wallpaper, and other user interface components available for download. The other components may comprise software loaded on the mobile device 110 that may access network services from providers located across networks. While network services may not comprise a user application 140 per se, network services are items of value, access to which may be available through the IAP 162. Network services may be acquired through the IAP 162 on a subscription basis from a services provider, for example, that may operate the content server 170.

Network services also may comprise applications and/or functionality provided by the network, for example the service provider network communications infrastructure, rather than by the mobile device 110 that may be related to the communications experience of the mobile device 110. For example, a call tone which is played back to a calling party originating a voice call to the mobile device 110 may be determined by network services. A different call tone may be defined for the mobile device 110 depending upon what IAP 162 is currently active and/or loaded for the mobile device 110. Loading of the user application 140 that may include access to network services may comprise loading software components on the mobile device 110 that periodically generate transmissions to external providers of services and request information, messages, news, or other items that may be periodically refreshed by the external provider. These software components may differ from widgets or internet links that may be also be periodically accessed.

The user applications 140, 142 may be specific to the business interests and operations of the content servers 170, 180. The IAPs 174, 184 providing the user applications 140, 142 may be downloadable and usable when the mobile device 110 is in the proximity of physical venues associated with the content servers 170, 180 or conditionally upon other factors or events, such as the mobile device 110 receiving a user input. The telecommunications service provider may precertify the user applications 140, 142 of the operators of the content servers 170, 180 and may precertify the software routines written to promote automated loading of their user applications 140, 142. By precertifying the user applications 140, 142 and their loading routines of a plurality of operators of content servers 170, 180, the telecommunications service provider may facilitate the mobile device 110 to exchange user interfaces when entering a plurality of physical venues associated with the content servers 170, 180.

The content servers 170, 180 may be associated with content providers, for example enterprises, businesses, or other entities, that may wish to provide a customized bundle or package of trusted user applications 140, 142 that may comprise the user interface for the mobile device 110. A set of user applications 140, 142 provided in a downloadable IAP 174 from the content servers 170, 180, respectively, comprises the full user interface after loading. The IAPs 174, 184, for example, may be downloadable from the content servers 170, 180 when the mobile device 110 physically enters a venue associated with the operators of the content servers 170, 180, upon the user of the mobile device 110 activating an input, or upon another event. When the user applications 140, 142 are loaded on the mobile device 110 providing the specialized user interface, the content server 170, through WiFi communication with the mobile device 110, may engage in customized interaction with the mobile device 110. This customized interaction may last while the mobile device 110 is in the physical proximity of the venue. The interaction may end when the mobile device 110 exits the venue and its proximity whereupon the user applications 140, 142 may be unloaded and a default or different set of user applications 140, 142 may automatically load or reload on the mobile device 110. While the mobile device 110 is in the proximity of the venue that, for example, may be a retail store, the content server 170 may stream music or other media to the mobile device 110 containing advertisements and announcements of promotions, may provide store floor plan maps, and may provide electronic coupons and product and pricing information.

The mobile device 110 may use network services, such as call tones, that are obtained and refreshed from providers across a network, for example the content server 170 of the retail store. While the mobile device 110 is in the retail store, for example, when a caller seeks to originate a voice call to the mobile device 110, a call tone is played back to the caller that indicates that the user is presently shopping at the retail store and urges callers to ask the user about the merchandise or services the user is viewing and learning about in the retail store. The user of the mobile device 110 may be provided an electronic coupon for items on sale at the retail store for agreeing to use the call tone with the advertising theme. The media provided by the content server 170 may be further customized based on profile information associated with the mobile device 110 and/or its user, for example information about previous visits to the retail store and products purchased and economic, demographic, and personal information about the user.

The telecommunications service provider may provide the initial user interface for the mobile device 110 in one of a plurality of downloadable IAPs 162. The IAPs 162 may be stored in the provider database 160 accessible by the provider server 150 associated with the telecommunications service provider. When the mobile device 110 is powered on for the first time, it may self-activate its account with the telecommunications service provider and reboot. After powering back on, the mobile device 110 may present an option to one of dial 911, the emergency telephone number for the North American Numbering Plan (NANP), and download an IAP 162 containing user applications 140, 142 that, when uncompressed and loaded, become the user interface for the mobile device 110. A software installer 130 and style guide 129 are included in the IAP 162. The software installer 130 uncompresses and loads the user applications 140, 142 provided by the IAP 162 selected using an automated loading routine involving little or no user action. The software installer 130 remains installed on the mobile device 110 and later may be used when subsequent IAPs 162 are downloaded from the provider server 150 or when other IAPs 174, 176, 178, 184, 186, 188 are downloaded from the content servers 170, 180. The process of downloading IAP 162 and/or IAP 174 from the provider server 150 and the content servers 170, 180, respectively, and the using of automated routines by the software installer 130 to load user applications 140, 142 that become the initial and subsequent user interfaces for the mobile device 110 may be sponsored by the telecommunications service provider. The telecommunications service provider may facilitate, in the interest of furthering business relationships, content providers that are business enterprises and other types of entities to develop user applications 140, 142 and automated loading routines that the telecommunications service provider may test and precertify that may be packaged into IAPs 174, 176, 178, 184, 186, 188 that may be downloadable by the mobile device 110 from the content servers 170, 180.

User applications 140, 142 comprise a plurality of application types that together comprise the interface or user experience for the mobile device 110. The user applications 140, 142 may comprise web widgets, tiles, really simple syndication (RSS) feed icons, media players, wallpapers, ring tones, and listings of links. While some of these items, for example wallpapers, may not be applications, the term user applications 140, 142 is meant herein to comprise applications and other software items that together comprise the full user interface as described herein. User applications 140, 142 also comprise access to network services that may comprise access to periodically changing content that is changed by providers across networks, for example call tones. Network services also may comprise, for example, the taking delivery of content from a provider across a network and displaying the content in the banner of the mobile device 110. Network services also may comprise receiving and displaying regular messages or announcements from external sources. Each IAP 162, 174, 176, 178, 184, 186, 188 may contain a unique combination of different user applications 140, 142. A single IAP 162, 174, 176, 178, 184, 186, 188 may comprise a complete user interface. IAPs 162, 174, 184 may combine, package, or bundle user applications 140, 142 by subject type, motif, or unifying idea. IAPs 174, 184 provided by the content servers 170, 180 may provide user applications 140, 142 that are directed to the business activities or interests of the content provider, for example an operator of retail stores, associated with the content servers 170, 180.

The mobile device 110 may be one of a mobile telephone, a media player, and a personal digital assistant (PDA). In addition to having a radio transceiver to exchange transmissions with the base transceiver station 190 for wireless voice and data communications, the mobile device 110 also may contain hardware and software providing WiFi functionality that may be used in connection with the mobile device 110 visiting commercial and other venues as described above. The mobile device 110, alternatively or in addition to WiFi technology, may contain other hardware and software associated with other wireless local area network technologies that may observe the IEEE (Institute of Electrical and Electronics Engineers) 802.11 set of standards.

In a first example, a first content provider may be a retailer of consumer products and may be associated with the content server 170. When the mobile device 110, through its signal beaconing or other method, is detected to enter the proximity of a retail store associated with the first content provider, the first content provider may detect the presence of the mobile device 110 and seek to cause the mobile device 110 to load a user interface associated with the first content provider. The content server 170 may determine through signaling generated by the mobile device 110 that the mobile device 110 has a subscription arrangement for wireless services with a first telecommunications services provider. The content server 170 may send an authorization token or other object providing authorized access to the first telecommunications services provider and may request the first telecommunications services provider to determine if the mobile device 110 has previously authorized or otherwise indicated receptivity to loading a user interface provided by the content server 170. In an embodiment, the user of the mobile device 110 may have indicated that the mobile device 110 will load user interfaces from some predetermined content providers, for example retailers, while the user interfaces provided by other content providers are not to be loaded. This also may comprise providing permission to activate the WiFi transceiver of the mobile device 110 if it is not activated at the time that the mobile device 110 comes into the proximity of a content provider that the user has approved.

Continuing with the first example, the first telecommunications services provider receives the authorization token from the content server 170 and processes the request from the content server 170 to determine if the mobile device 110 has previously authorized receiving the user interface from the content server 170. Receiving the user interface comprises downloading, uncompressing, and loading at least one IAP 174 from the content server 170. If the first telecommunications services provider determines from its records that the mobile device 110 authorized receiving the user interface from the content server 170, the telecommunications services provider passes the authorization token provided earlier by the content server 170 in its request to the mobile device 110. The mobile device 110 passes the authorization token to the content server 170. The content server 170 may examine the authorization token to verify that it is the authorization token it sent earlier to the telecommunications services provider. Upon verification, the content server 170 may send signaling to the mobile device 110 requesting it to activate its WiFi transceiver so it may then download the IAP 174 from the content server and load the user applications 140, 142 contained therein. In an embodiment, the mobile device 110 may activate its WiFi transceiver upon receiving the authorization token from the telecommunications services provider and not wait for instruction from the content server 170. After activating its WiFi transceiver, the mobile device 110 may establish a session with the content server 170, view a description of the IAPs 174, 176, 178 available on the content server 170, and download one IAP 174, 176, 178. The content server 170 may examine a profile provided by the mobile device 110 or another component that the content server 170 may use to qualify the mobile device 110 for receipt of an IAP 174. The content server 170 also may apply at least one policy to the mobile device 110 to further qualify the mobile device 110. Policies may be based on a service plan the mobile device 110 may have with the telecommunications service provider. The profiles and policies may be used to filter out some IAPs 174, 176, 178 that may not be appropriate for some mobile devices 110 or their users. A profile, for example, might contain parental controls that limit the type of user applications 140, 142 that might be made available in a user interface for an underage user. The profile and policies also may be used to provide the mobile device 110 with some items of value specific to the user of the mobile device 110, for example electronic coupons.

Once qualified and the eligible IAPs 174, 176, 178 have been determined, the mobile device 110 selects an IAP 174 that is downloaded and its component user applications 140, 142 are loaded on the mobile device 110 and may remain loaded while the mobile device 110 is in the predetermined proximity of the retail store. When the user applications 140, 142 are loaded, they may replace user applications 140, 142 loaded from a different IAP 162, 176, 178, 184, 186, 188 downloaded earlier from the provider server 150 or downloaded from the same or a different content server 170, 180. The unloaded user applications 140, 142 may be either deleted or partially or totally cached. If the user of the mobile device 110 intends to use the unloaded user interface again, the IAP 120 may cache the entirety or a portion of the unloaded user applications 140, 142 on the mobile device 110 or in a remote storage device. In an embodiment, the portions of the unloaded user applications 140, 142 may comprise authorizations secured for using the unloaded user applications 140, 142 and template files used for rendering them. It may not be feasible to cache the other portions of the unloaded user applications 140, 142 because these portions may be cumbersome to store and also may comprise volatile and periodically updated information. The present disclosure teaches the reloading of unloaded and cached user applications 140, 142. In an embodiment, the mobile device 110 may display a default user interface comprising user applications 140, 142 downloaded from the provider server 150 that may be associated with the telecommunications service provider. The mobile device 110 may use the default user interface except during times when it is in the proximity of predetermined retail venues designated and authorized by the user of the mobile device 110. When the mobile device 110 is moved outside the proximity of those retail venues, the user interface comprising user applications 140, 142 downloaded from the content servers 170, 180 associated with those venues is unloaded and the default user interface that was previously downloaded from the provider server 150 or another component may be reloaded.

The present disclosure teaches the loading and unloading of user applications 140, 142 that may be less comprehensive than the full installation and deletion of the user applications 140, 142. When user applications 140, 142 that presently comprise the user interface are to be replaced by user applications 140, 142, the replaced user applications 140, 142 may be fully or partially cached and saved locally on the mobile device 110 or in a remote storage location. While portions of the unloaded user applications 140, 142 may represent volatile or perishable information such as stock market prices, sports scores, or weather information, this information may represent deliverable, consumable content as opposed to application content that generally may not be volatile. While current weather information, for example, may not be saved, the template parameters used to provide the weather information, for example the geographic area of the user and the information the user has chosen to view, may not change. While the initial downloading and loading of the first IAP 162 from the provider server 150 when the mobile device 110 is new may comprise installation of the user applications 140, 142 provided therein, subsequent actions regarding user interfaces may be characterized as loading, unloading, and reloading, as all or portions of the unloaded user applications 140, 142 may be retained for future use. While full deletions of user interfaces comprising user applications 140, 142 may occur in an embodiment, the present disclosure teaches that the entirety or portions of user interfaces that are unloaded may be cached for future use.

Continuing with the first example involving the content server 170 associated with a retailer and its store locations, when the mobile device 110 has downloaded the IAP 174 provided by the content server 170 and loads the user applications 140, 142 comprising the retailer's customized user interface, the content server 170 may engage in specialized communications with the mobile device 110. While the mobile device 110 is in or near the retail store, the content server 170 may stream music to the mobile device 110 that may contain advertisements and announcements of prices, product information, and promotions in the retail store. One of the user applications 140, 142 may be a floor plan map of the retail store with a directory or may be a search engine that the mobile device 110 may use to locate merchandise in the retail store, at other physical locations, in online catalogs, or elsewhere. The content server 170 also may examine the profiles of the mobile device 110 and/or its user, analyze previous transaction history, and analyze the movements of the mobile device 110 about the retail store. The content server 170 also may analyze demographic, socioeconomic, and educational history information on file about the user of the mobile device 110. The content server 170 may present promotional material, electronic coupons, and other incentives based on the analysis. While in or near the retail store, the ring tone and other sensory or interactive features of the mobile device 110 may be provided by the content server 170. Network services associated with the IAP 174 loaded may associate a call tone associated with the business of the retailer to the mobile device 110, so that a caller originating a voice call to the mobile device 110 hears a call tone that is defined for the subject IAP 174. As an example, the call tone may comprise a message that characterizes the retail store in a favorable light or provides a commercial message. Web widgets associated with the retailer may execute in the display of the mobile device 110 and may connect with internet web sites associated with the retailer. The web widgets may display streamed information or video material about merchandise for sale in the retail store or elsewhere. The mobile device 110 may be able to look up and view product specifications and/or reviews. Once the mobile device 110 is detected to exit the store and move beyond the predetermined distance from the retail store, the user applications 140, 142 downloaded from the content server 170 may unload and the default or previous user applications 140, 142 may be reloaded to the mobile device 110.

The base transceiver station 190 may be any of a cellular wireless base station, for example a Code Division Multiple Access (CDMA), a Global System for Mobile Communications (GSM), a Universal Mobile Communications System (UMTS), and/or Long-term Evolution (LTE) cellular wireless base station; a Worldwide Interoperability for Microwave Access (WiMAX) base station; a WiFi access point; a femtocell; or other wireless access devices. While FIG. 1 depicts only one base transceiver station 190, in an embodiment a plurality of base transceiver stations 190 may be existent and in operation.

The network 192 promotes communication between the components of the system 100. The network 192 may be any communication network including a public data network (PDN), a public switched telephone network (PSTN), a private network, and/or a combination.

While the present disclosure has discussed detection by the content server 170, 180 of the proximity of the mobile device 110, in an embodiment, detection may take place in other manners. For example, a wireless services provider that may be associated with at least one base transceiver station 190 may detect the presence of the mobile device 110. The location of the mobile device 110 may be detected by the identification of the global positioning system (GPS) coordinates of the mobile device 110 or by the radio frequency signal strength associated with the mobile device 110 and by using trilateration. The wireless services provider may work with the infrastructure of the content provider, for example the content server 170, 180 to obtain and pass authorization tokens, WiFi network names, and passwords. The wireless services provider that may be the same entity as the telecommunications services provider or may be associated with the telecommunications services provider, then may engage in the process described herein wherein the willingness of the user of the mobile device 110 to download the IAP 174 from the content server 170 is determined. Once determined, the authorization tokens are passed, steps are taken to activate the WiFi transceiver of the mobile device 110, and the IAP 174 is downloaded, uncompressed, and the user applications 140, 142 contained within are loaded on the mobile device 110.

The IAP 120 comprises an initial core bundle 121 and an additional bundle 123. Initial core bundle 121 comprises an installation component 122 that interacts with the software installer 130 to load the user applications 140, 142 contained in the IAP 162 received from the provider server 150 after the mobile device 110 is initially activated for service by the telecommunications service provider. The provider server 150 also may be accessed after the initial downloading of the IAP 162 for access to a second or subsequent IAP 162 to replace the user applications 140, 142 loaded from the initial IAP 162. The installation component 122 also interacts similarly with the software installer 130 when any one of the IAPs 174, 176, 178, 184, 186, 188 is being downloaded from content servers 170, 180 associated with content providers other than the telecommunications service provider. The software installer 130 may be included in each IAP 162, 174, 176, 178, 184, 186, 188. The software installer 130 remains loaded and ready to use on the mobile device 110 after it has been downloaded the first time. Each IAP 162, 174, 176, 178, 184, 186, 188 also may include a style guide 129. Even though the user applications 140, 142 originating from the provider server 150 and content servers 170, 180 may be precertified and trusted and provide automated loading routines requiring little or no user action, the user applications 140, 142 still may be configured and selectively unloaded after their automated loading. The style guide 129 may be used in configuring loaded user applications 140, 142. In an embodiment, the style guide 129 may indicate the manner in which icons are displayed on the user interface. In an embodiment, the style guide 129 may indicate a font size and display size of the user interface. In an embodiment, the user interface comprising at least one user application 140, 142 as taught herein may be referred to as a mobile ego.

The IAP 120 also comprises a selection component 124 that is used to configure choices regarding the retailers and other entities from which the user of the mobile device 110 selects download IAPs 174, 176, 178, 184, 186, 188 comprising alternate user interfaces. The selection component 124 accepts and executes configuration instructions regarding the content servers 170, 180 that the mobile device 110 may access. The selection component 124 may execute instructions regarding content servers 170, 180 whose transmissions are to be blocked at either specific times or at all times or for specific users, in the case of underage users, for example. The selection component 124 may configure how requests from content servers 170, 180 are to be processed regarding the activation of a WiFi transceiver or similar functionality associated with the mobile device 110 that may be used to exchange transmissions and conduct business while the mobile device 110 is proximate the retail store or other venue associated with the content servers 170, 180. In an embodiment, the selection component 124 may be used to turn on the WiFi transceiver when messages are received from one or more designated content servers 170, 180 requesting activation of the WiFi transceiver, after the verification process described above involving the telecommunications services provider and passage of authentication tokens has completed. In an embodiment, the selection component 124 may instead provide an audible or other notification that a content server 170, 180 has sent a message requesting the activation of the WiFi transceiver and may provide the user of the mobile device 110 the option of accepting or declining the request.

The IAP 120 also comprises a transaction component 126 that promotes the mobile device 110 interacting with the content servers 170, 180 and other components during sessions wherein user applications 140, 142 associated with IAPs 174, 184 are in use on the mobile device 110. When the mobile device 110 is in the proximity of a retail store associated with one of the content servers 170, 180, the transaction component 126 may be used to transact business with the retail store, for example accessing an electronic wallet application to complete a point of sale transaction.

The transaction component 126 also may receive and display electronic coupons or other items of value provided by the retailer. The transaction component 126 may be used to submit bids or other transaction communication when the content provider associated with the content server 170, 180 is an auction company The IAP 120 also comprises a restoration component 128 that reloads on the mobile device 110 the default or previous user interface comprising an earlier set of user applications 140, 142 that was temporarily unloaded while an IAP 174, 176, 178, 184, 186, 188 was downloaded from a content server 170, 180 and loaded on the mobile device 110. When a first user interface is unloaded so it may be replaced by user applications 140, 142 comprising a second user interface, the user may wish to subsequently reload the first user interface. Instead of deleting and later fully reloading the first user interface, portions of the user applications 140, 142 comprising the first user interface may be cached. The portions that are cached may be stored locally on the mobile device 110 or may be stored in a remote device.

When a set of user applications 140, 142 comprising the second user interface is unloaded because the mobile device 110 has moved out of the proximity of a retail store or because of user input or occurrence of other event, the restoration component 128 may reload the previous, default, or first user interface. This action may involve bringing the saved files from the first user interface out of cache, accessing current versions of the user applications 140, 142 that were unloaded when the second user interface was loaded, and combining the saved portions with the newly generated current versions of the files that were unloaded in a manner that the first user interface is reloaded but with refreshed versions of user applications 140, 142. When the first user interface was unloaded, template files used for rendering user applications 140, 142 and authorizations may have been cached. The restoration component 128 locates the cached files and downloads the current portions of the files that may not have been saved because they were associated with perishable content, for example. The restoration component 128 may initiate a session with the provider server 150, content servers 170, 180, or other component to access the desired files. The files may be provided in an IAP 162, 174, 176, 178, 184, 186, 188 provided by the provider server 150 or the content servers 170, 180, respectively. When combining the cached files with the newly generated current versions of the previously unloaded files, the restoration component may follow specialized routines to overcome issues presented by files having different versions. The restoration component 128 determines the routines to follow to perform the combination of these files such that the desired current version of the first user interface may be restored to the mobile device 110.

Figure 2:
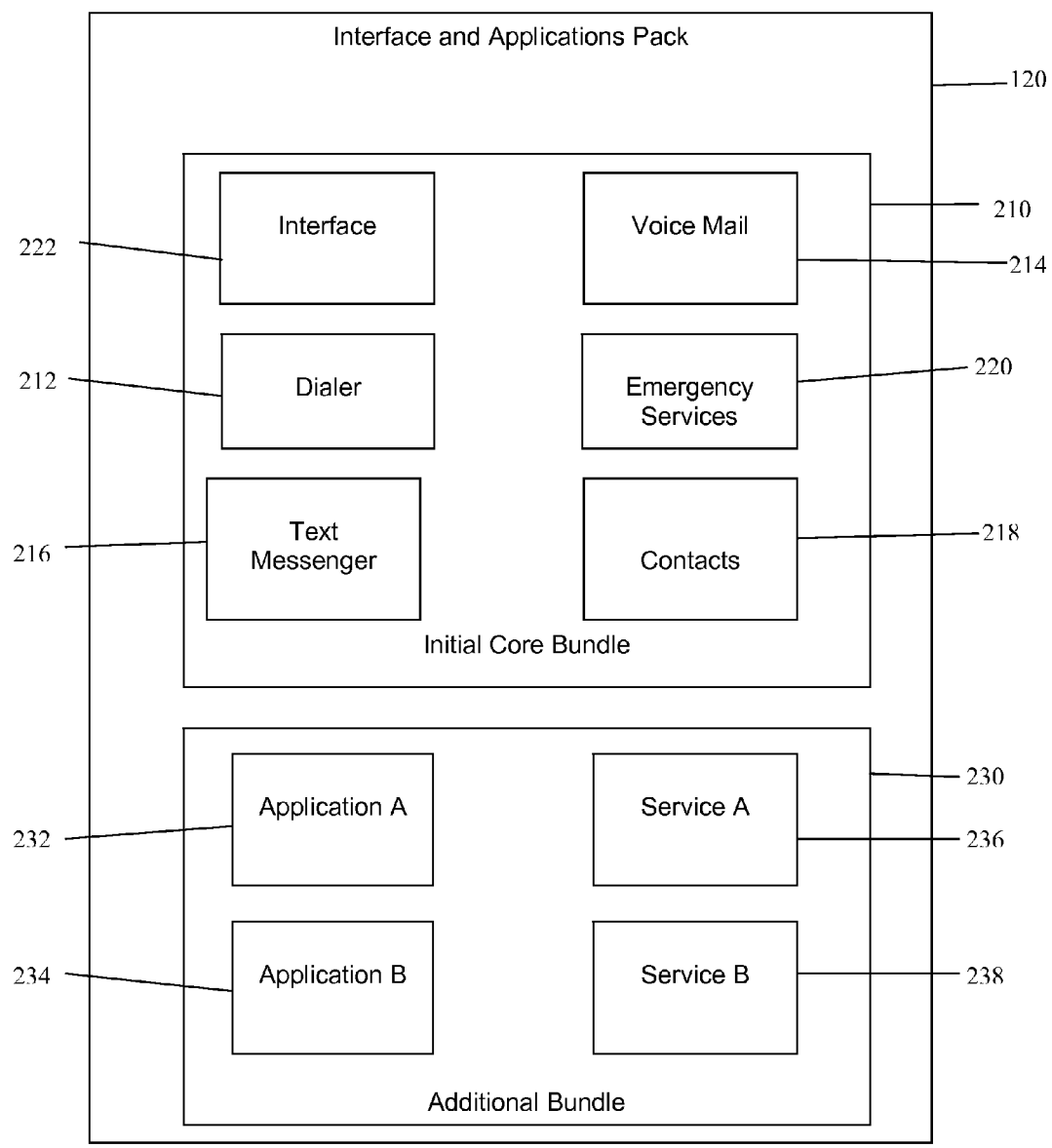
FIG. 2 is a block diagram of an Interface and Applications Pack according to an embodiment of the disclosure.

Turning now to FIG. 2, an exemplary IAP 120 is provided. IAP 120 is an exemplary IAP that may be implemented as any of IAPs 120, 162, 174, 176, 178, 184, 186, 188 depicted in FIG. 1. IAP 120 may include an initial core bundle 210 and an additional bundle 230. Initial core bundle 210 may include instructions for providing a user interface 222 and the functionality for a dialer 212, voice mail 214, a text messenger 216, a contacts list 218, and emergency services access 220. Additional bundle 230 may comprise instructions for installing or providing the functionality for one or more applications 232, 234 and one or more services 236, 238. The initial core bundle 210 may typically be transmitted to the mobile device 110 first before the remaining additional bundle(s) 230 is transmitted. In that manner, the mobile device 110 can install the interface and core functionality provided by the initial core bundle 210 quickly and enable the user to begin using their mobile device before the remaining additional bundle(s) 230 has been completely received and installed. This increases user satisfaction with the IAP 120 by providing quicker access to functionality that may be delayed if the entire IAP must be received and installed before use. Although IAP 120 is depicted as including only one additional bundle 230, those skilled in the art will recognize that IAP 120 may include a plurality of additional bundles. In some embodiments, having several additional bundles may be desirable in order to make bundle sizes for transmission smaller.

Figure 3:
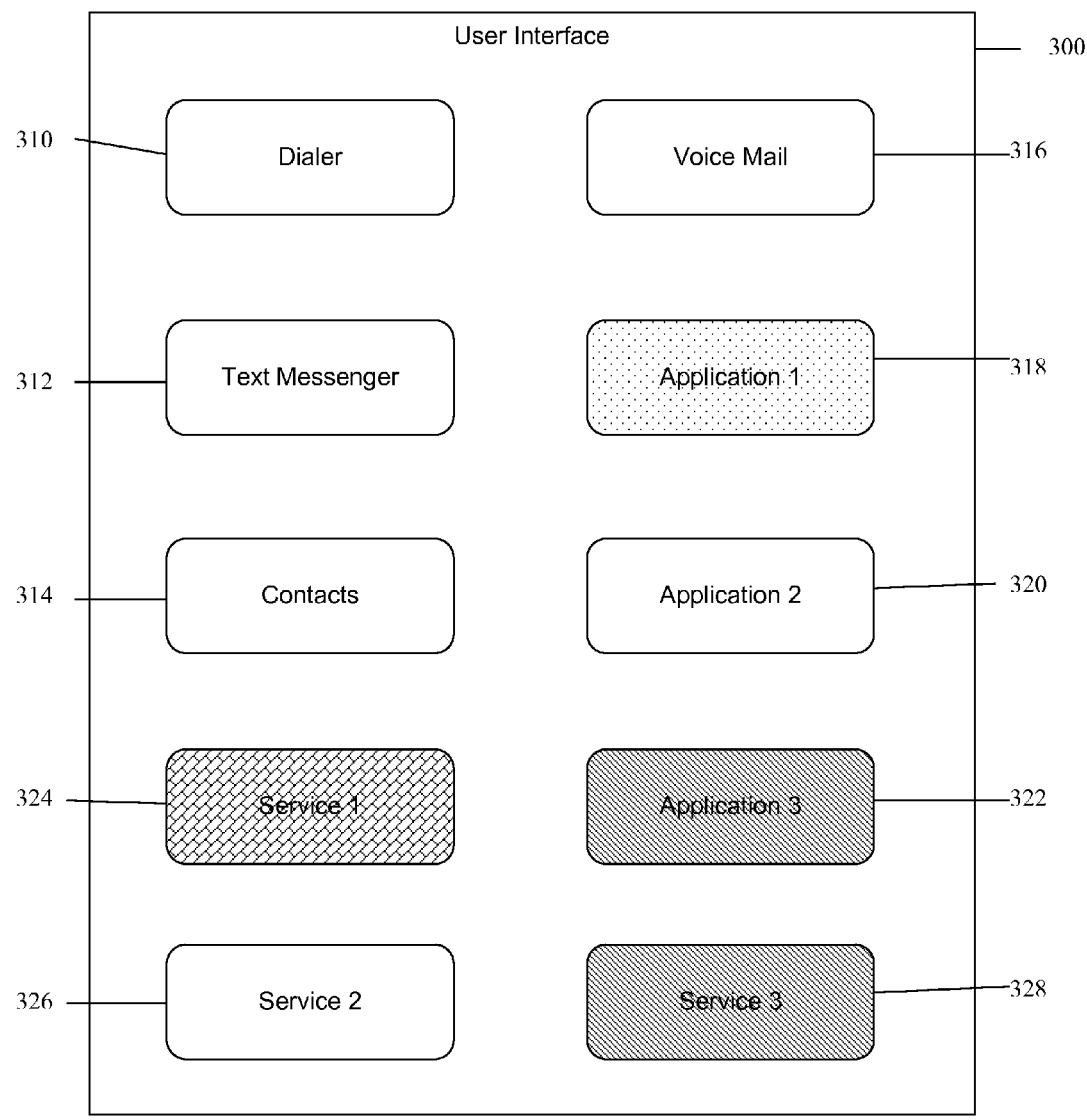
FIG. 3 is a block diagram of a user interface according to an embodiment of the disclosure.

Turning now to FIG. 3, an exemplary user interface 300 that may be provided to a user upon receipt of the initial core bundle 210 is depicted. User interface 300 may include a dialer icon 310, a text messenger icon 312, a contacts icon 314, voice mail icon 316, application 1 icon 318, application 2 icon 320, application 3 icon 322, service 1 icon 324, service 2 icon 326, and service 3 icon 328. An icon may be any visual representation that identifies an identity of an associated application and/or service. In an embodiment, an icon may be a picture (or other graphic) with or without associated text or may be only text. In an embodiment, an icon may change dynamically over time, such as, for example, rotate, flash, change shapes, etc. When selected by a user, dialer icon 310 provides access to a dialer enabling the user to call another user. When selected by a user, text messenger icon 312 provides access to a text messaging application enabling the user to send a text message to another user. When selected by a user, voice mail icon 316 enables the user to access their voice mail. When selected by a user, contacts icon 314 provides access to the user's contacts directory. Similarly, each of the other icons 318, 320, 322, 324, 326, and 328, when selected by a user, launch an associated application or service.

User interface 300 may provide a visual indicator (e.g., greying out an icon, highlighting an icon, changing the color of the icon, causing an icon to flash, changing the shape of the icon, animating the icon) or visual indicia or viewable indicia that may indicate the status of the associated application or service. The status of the application or service may be, for example, not yet downloaded or installed, not yet loaded, unavailable, not currently available for use, not yet used, used infrequently, or used frequently. In an embodiment, the application or service may have other status values or states not identified here. For example, application 1 may not yet have been downloaded and or installed on the mobile device 110. Thus, application 1 icon 318 may have a visual indicator that indicates to the user that application 1 is not yet ready for user. However, by showing the icon on the user interface 300, the user is informed that this application will be available at some later point in time. As another example, the user interface 300 may provide a visual indicator with the service 1 icon 324 indicating that service 1 has never been tried. Similarly, user interface 300 may provide a visual indicator with application 3 icon 322 and service 3 icon 328 indicating that these applications and services have been used, but only infrequently. Indicating that a service has never been tried by the user or has been tried, but only infrequently, may encourage the user to try the service and/or application. The definition of infrequently may vary by implementation. However, in an embodiment, infrequently may mean that the user has tried the application one time over the course of a month. In an embodiment, infrequently may mean that the user has tried the application less than five times over the course of six months.

As different application(s) and/or service(s) are used, the interface 300 may change the display dynamically to reflect the current state. Thus, once application 1 has completed installation, the visual indicator for application 1 icon 318 may be changed to reflect that the application 1 is available for use. Similarly, as application(s) and/or service(s) are used by the user, the visual indicators may change. Thus, the icons for some application(s) or service(s) that show they have never been used or used only infrequently may change to indicate a change in their status. Application(s) and/or service(s) whose icons do not currently indicate that their use is infrequent may change to indicate such if the user neglects to use them for a prolonged period of time.

Figure 4:
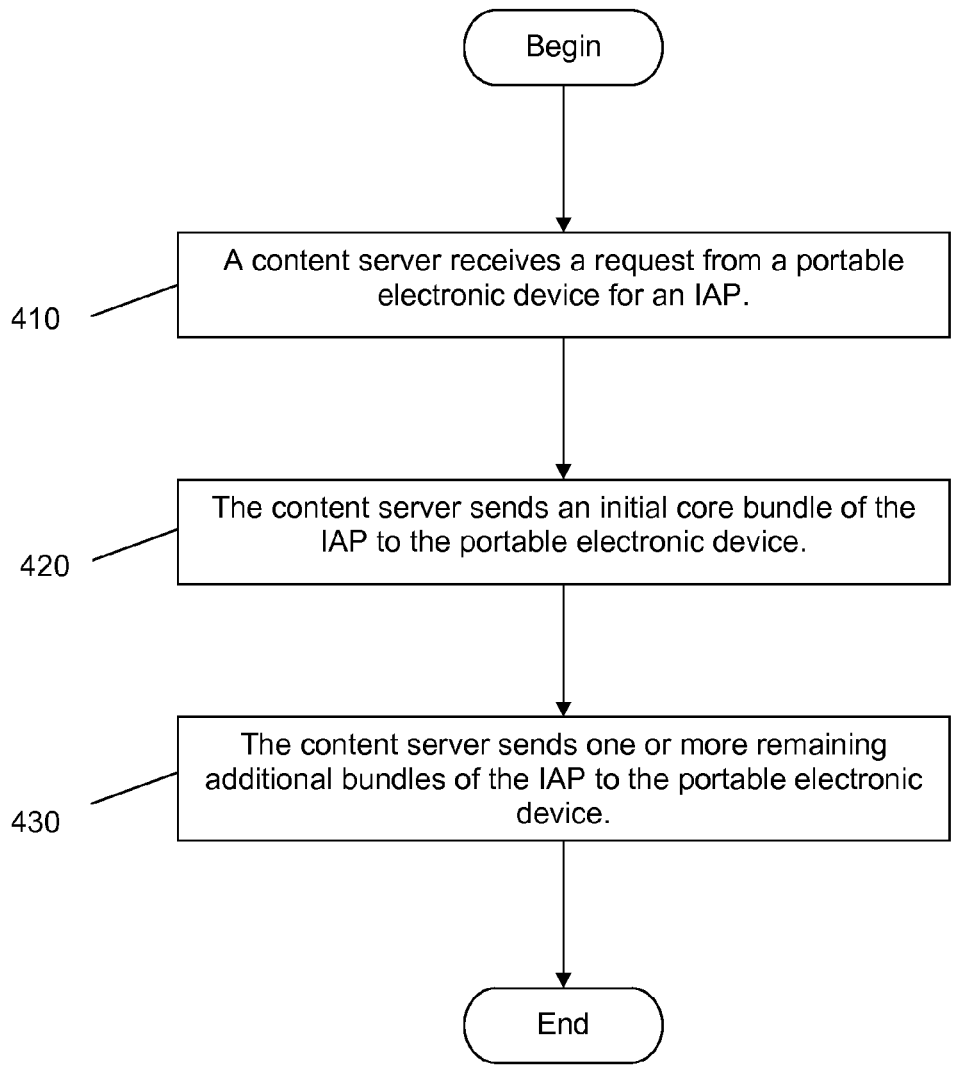
FIG. 4 is a flow chart illustrating a method according to an embodiment of the disclosure.

Turning now to FIG. 4, a method 400 for providing an IAP to a mobile device is provided. Beginning at block 410, a content provider, telecommunications provider, or other component receives a request from a mobile device for an IAP. At block 420, the content provider or other component transmits an initial core bundle of the IAP to the mobile device. At block 430, the content server or other component transmits one or more remaining additional bundles of the IAP to the mobile device.

Figure 5:
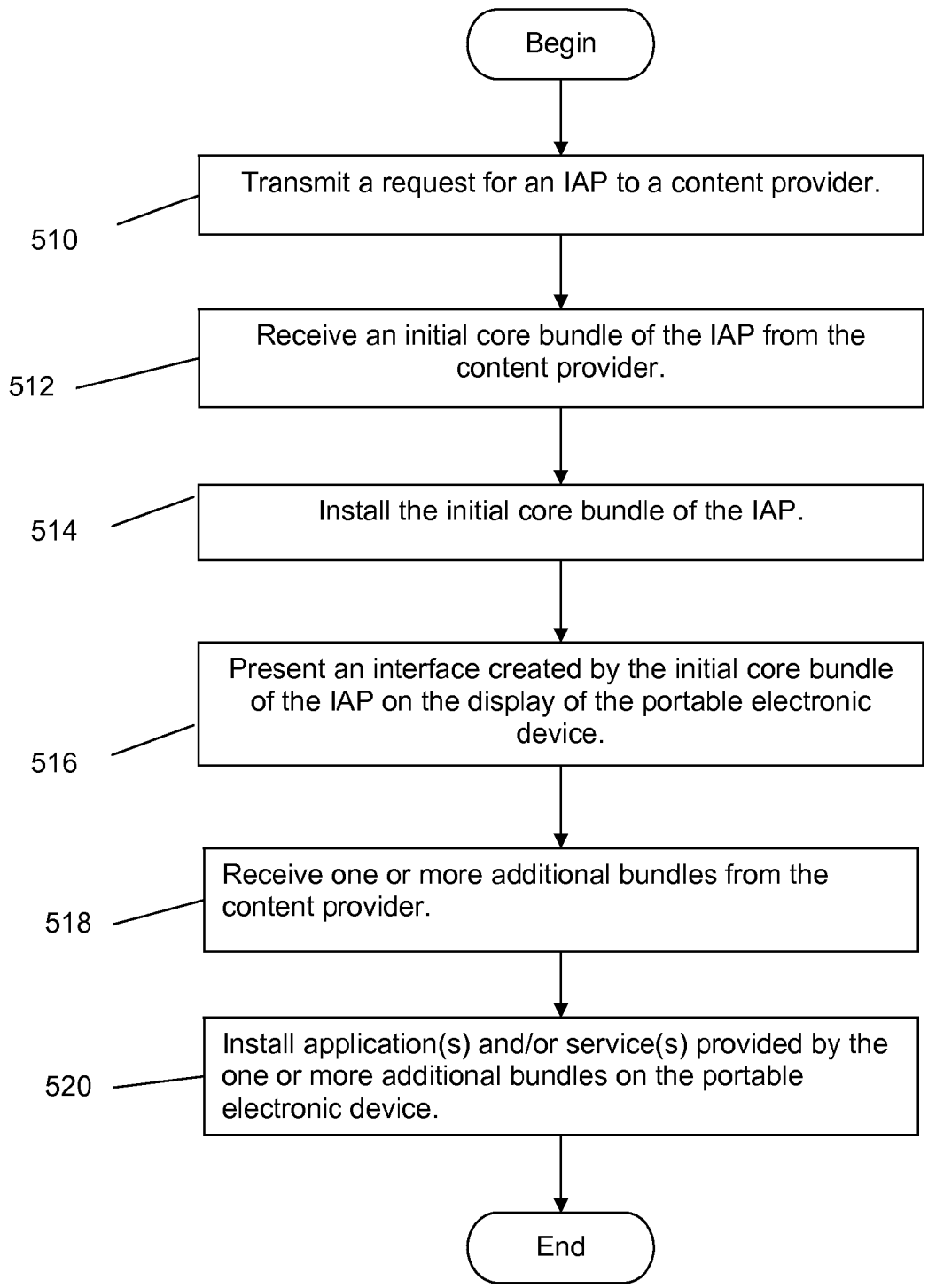
FIG. 5 is a flow chart illustrating a method according to an embodiment of the disclosure.

Turning now to FIG. 5, a method 500 for receiving and installing an IAP on a mobile device is provided. Beginning at block 510, the mobile device transmits a request for an IAP to a content provider, a service provider, or other component. At block 512, the mobile device receives an initial core bundle from the content provider or other component. At block 514, the mobile device installs the initial core bundle of the IAP. At block 516, the mobile device presents an interface created using the initial core bundle of the IAP on the display of the mobile device. At block 518, the mobile device receives one or more additional bundles of the IAP from the content provider or other component. At block 520, the mobile device installs the application(s) and/or service(s) provided by the one or more additional bundles of the IAP onto the mobile device.

Figure 6:
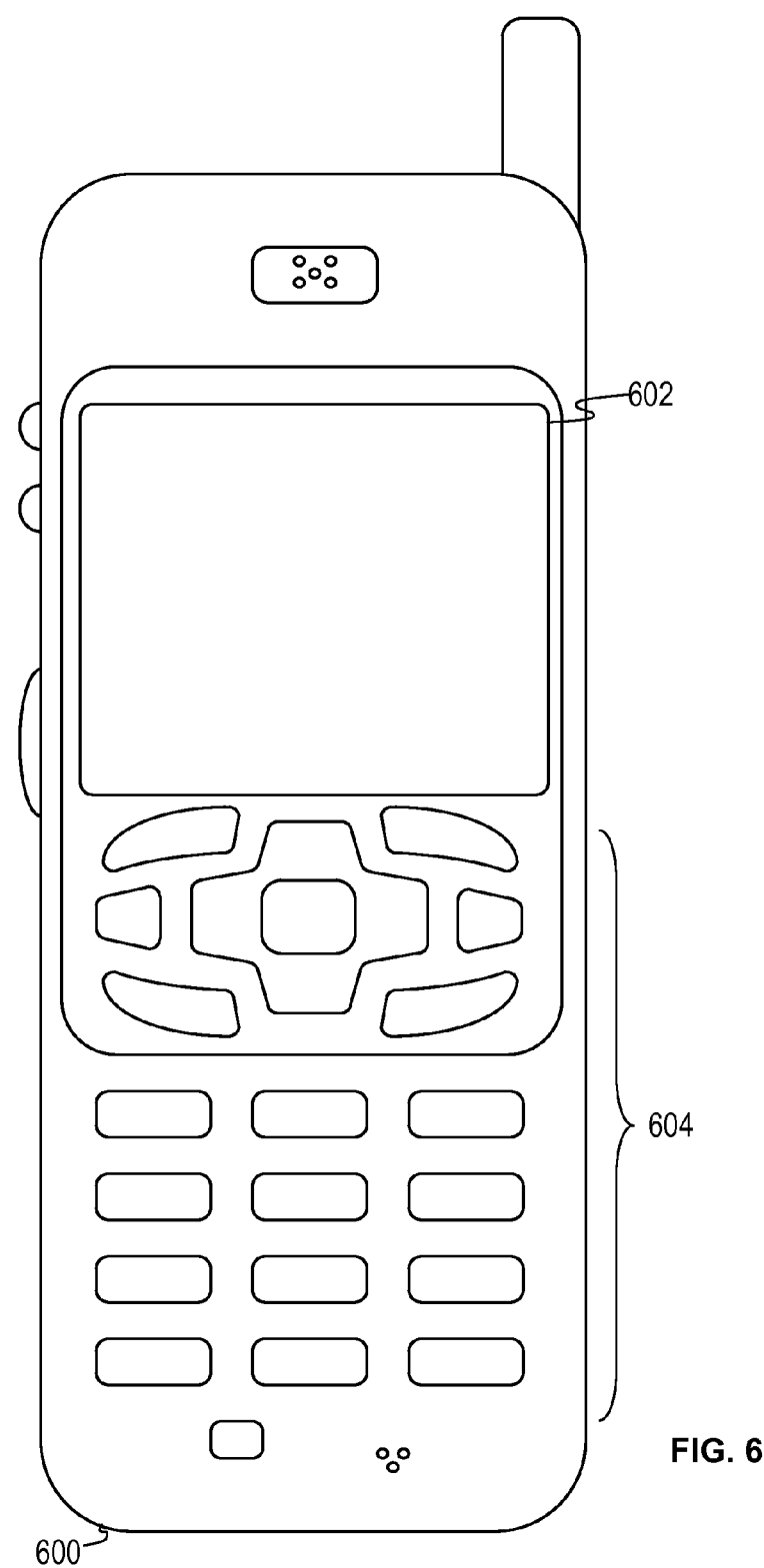
FIG. 6 is a pictorial diagram of a mobile device according to an embodiment of the disclosure.

FIG. 6 shows a wireless communications system including the mobile device 600. FIG. 6 depicts the mobile device 600, which is operable for implementing aspects of the present disclosure, but the present disclosure should not be limited to these implementations. Though illustrated as a mobile phone, the mobile device 600 may take various forms including a wireless handset, a pager, a personal digital assistant (PDA), a gaming device, or a media player. The mobile device 600 includes a display 602 and a touch-sensitive surface and/or keys 604 for input by a user. The mobile device 600 may present options for the user to select, controls for the user to actuate, and/or cursors or other indicators for the user to direct. The mobile device 600 may further accept data entry from the user, including numbers to dial or various parameter values for configuring the operation of the handset. The mobile device 600 may further execute one or more software or firmware applications in response to user commands. These applications may configure the mobile device 600 to perform various customized functions in response to user interaction. Additionally, the mobile device 600 may be programmed and/or configured over-the-air, for example from a wireless base station, a wireless access point, or a peer mobile device 600. The mobile device 600 may execute a web browser application which enables the display 602 to show a web page. The web page may be obtained via wireless communications with a base transceiver station, a wireless network access node, a peer mobile device 600 or any other wireless communication network or system.

Figure 7:
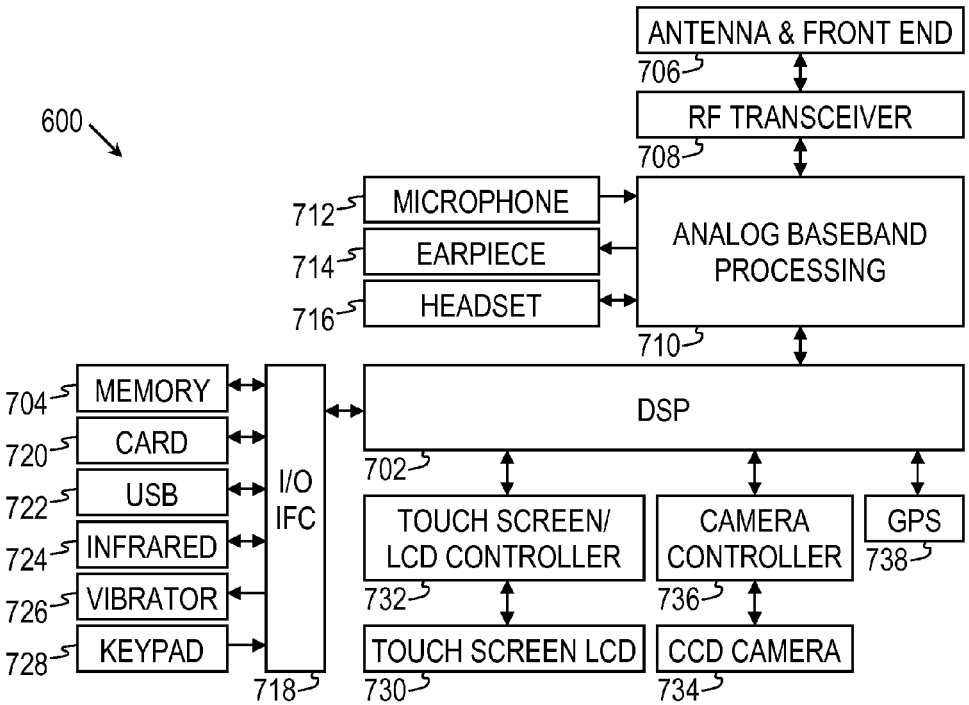
FIG. 7 is a block diagram of a mobile device according to an embodiment of the disclosure.

FIG. 7 shows a block diagram of the mobile device 600. While a variety of known components of handsets are depicted, in an embodiment a subset of the listed components and/or additional components not listed may be included in the mobile device 600. The mobile device 600 includes a digital signal processor (DSP) 702 and a memory 704. As shown, the mobile device 600 may further include an antenna and front end unit 706, a radio frequency (RF) transceiver 708, a baseband processing unit 710, a microphone 712, an earpiece speaker 714, a headset port 716, an input/output interface 718, a removable memory card 720, a universal serial bus (USB) port 722, an infrared port 724, a vibrator 726, a keypad 728, a touch screen liquid crystal display (LCD) with a touch sensitive surface 730, a touch screen/LCD controller 732, a camera 734, a camera controller 736, and a global positioning system (GPS) receiver 738. In an embodiment, the mobile device 600 may include another kind of display that does not provide a touch sensitive screen. In an embodiment, the DSP 702 may communicate directly with the memory 704 without passing through the input/output interface 718. Additionally, in an embodiment, the mobile device 600 may comprise other peripheral devices that provide other functionality.

The DSP 702 or some other form of controller or central processing unit operates to control the various components of the mobile device 600 in accordance with embedded software or firmware stored in memory 704 or stored in memory contained within the DSP 702 itself. In addition to the embedded software or firmware, the DSP 702 may execute other applications stored in the memory 704 or made available via information carrier media such as portable data storage media like the removable memory card 720 or via wired or wireless network communications. The application software may comprise a compiled set of machine-readable instructions that configure the DSP 702 to provide the desired functionality, or the application software may be high-level software instructions to be processed by an interpreter or compiler to indirectly configure the DSP 702.

The DSP 702 may communicate with a wireless network via the analog baseband processing unit 710. In some embodiments, the communication may provide Internet connectivity, enabling a user to gain access to content on the Internet and to send and receive e-mail or text messages. The input/output interface 718 interconnects the DSP 702 and various memories and interfaces. The memory 704 and the removable memory card 720 may provide software and data to configure the operation of the DSP 702. Among the interfaces may be the USB port 722 and the infrared port 724. The USB port 722 may enable the mobile device 600 to function as a peripheral device to exchange information with a personal computer or other computer system. The infrared port 724 and other optional ports such as a Bluetooth® interface or an IEEE 802.11 compliant wireless interface may enable the mobile device 600 to communicate wirelessly with other nearby handsets and/or wireless base stations.

The keypad 728 couples to the DSP 702 via the interface 718 to provide one mechanism for the user to make selections, enter information, and otherwise provide input to the mobile device 600. Another input mechanism may be the touch screen LCD 730, which may also display text and/or graphics to the user. The touch screen LCD controller 732 couples the DSP 702 to the touch screen LCD 730. The GPS receiver 738 is coupled to the DSP 702 to decode global positioning system signals, thereby enabling the mobile device 600 to determine its position.

Figure 8A:
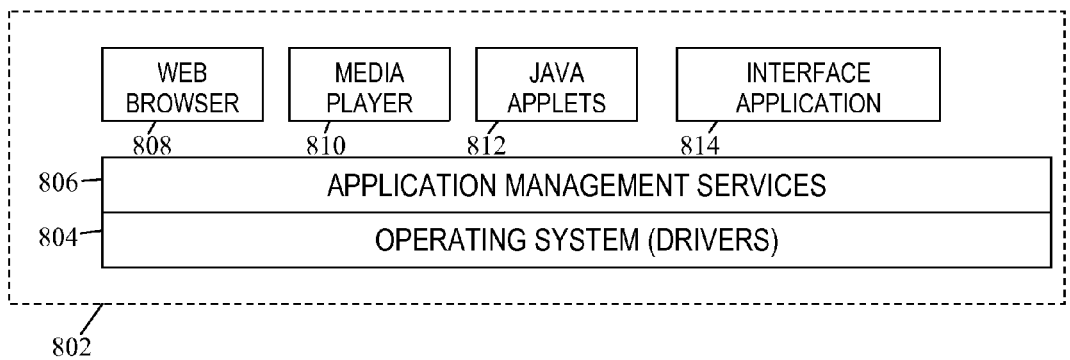
FIG. 8A is a block diagram of a software architecture for a mobile device according to an embodiment of the disclosure.

FIG. 8A illustrates a software environment 802 that may be implemented by the DSP 702. The DSP 702 executes operating system software 804 that provides a platform from which the rest of the software operates. The operating system software 804 may provide a variety of drivers for the handset hardware with standardized interfaces that are accessible to application software. The operating system software 804 may be coupled to and interact with application management services (AMS) 806 that transfer control between applications running on the mobile device 600. Also shown in FIG. 8 are a web browser application 808, a media player application 810, and JAVA applets 812. The web browser application 808 may be executed by the mobile device 600 to browse content and/or the Internet, for example when the mobile device 600 is coupled to a network via a wireless link. The web browser application 808 may permit a user to enter information into forms and select links to retrieve and view web pages. The media player application 810 may be executed by the mobile device 600 to play audio or audiovisual media. The JAVA applets 812 may be executed by the mobile device 600 to provide a variety of functionality including games, utilities, and other functionality.

Figure 8B:
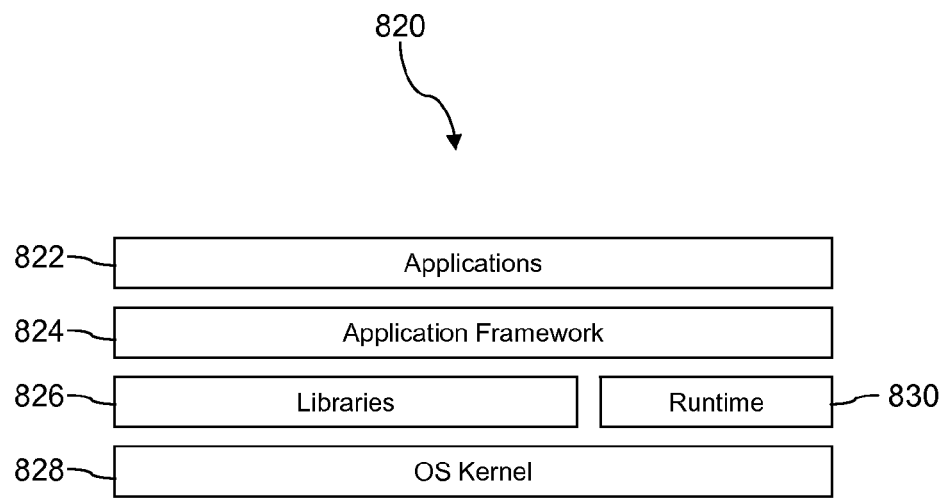
FIG. 8B is a block diagram of a software architecture for a mobile device according to an embodiment of the disclosure.

FIG. 8B illustrates an alternative software environment 820 that may be implemented by the DSP 702. The DSP 702 executes operating system software 828 and an execution runtime 830. The DSP 702 executes applications 822 that may execute in the execution runtime 830 and may rely upon services provided by the application framework 824. Applications 822 and the application framework 824 may rely upon functionality provided via the libraries 826.

Figure 9:
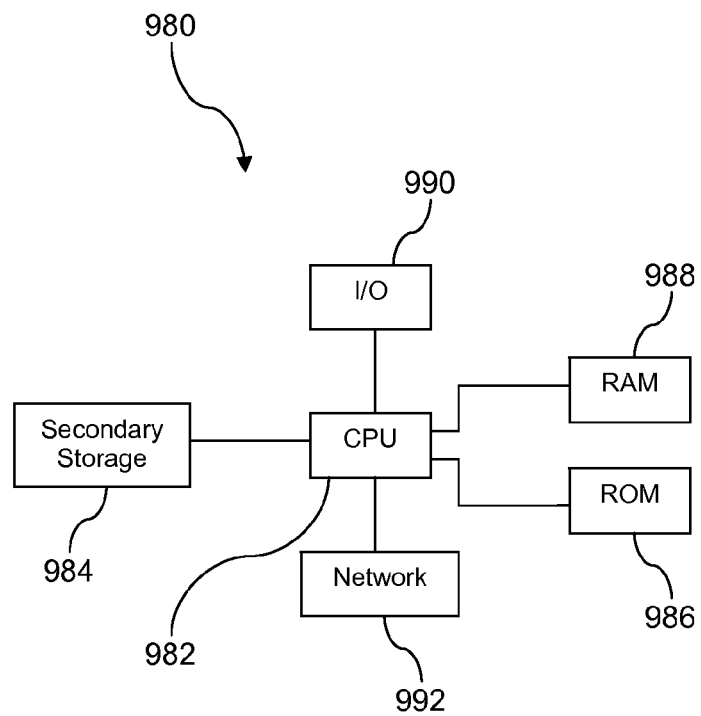
FIG. 9 illustrates an exemplary computer system suitable for implementing some aspects of the several embodiments of the disclosure.

FIG. 9 illustrates a computer system 980 suitable for implementing one or more embodiments disclosed herein. The computer system 980 includes a processor 982 (which may be referred to as a central processor unit or CPU) that is in communication with memory devices including secondary storage 984, read only memory (ROM) 986, random access memory (RAM) 988, input/output (I/O) devices 990, and network connectivity devices 992. The processor 982 may be implemented as one or more CPU chips.

It is understood that by programming and/or loading executable instructions onto the computer system 980, at least one of the CPU 982, the RAM 988, and the ROM 986 are changed, transforming the computer system 980 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 984 is typically comprised of one or more disk drives or tape drives and is used for non-volatile storage of data and as an over-flow data storage device if RAM 988 is not large enough to hold all working data. Secondary storage 984 may be used to store programs which are loaded into RAM 988 when such programs are selected for execution. The ROM 986 is used to store instructions and perhaps data which are read during program execution. ROM 986 is a non-volatile memory device which typically has a small memory capacity relative to the larger memory capacity of secondary storage 984. The RAM 988 is used to store volatile data and perhaps to store instructions. Access to both ROM 986 and RAM 988 is typically faster than to secondary storage 984. The secondary storage 984, the RAM 988, and/or the ROM 986 may be referred to in some contexts as computer readable storage media and/or non-transitory computer readable media.

I/O devices 990 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 992 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (Wi-MAX), and/or other air interface protocol radio transceiver cards, and other well-known network devices. These network connectivity devices 992 may enable the processor 982 to communicate with the Internet or one or more intranets. With such a network connection, it is contemplated that the processor 982 might receive information from the network, or might output information to the network in the course of performing the above-described method steps. Such information, which is often represented as a sequence of instructions to be executed using processor 982, may be received from and outputted to the network, for example, in the form of a computer data signal embodied in a carrier wave.

Such information, which may include data or instructions to be executed using processor 982 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well known to one skilled in the art. The baseband signal and/or signal embodied in the carrier wave may be referred to in some contexts as a transitory signal.

The processor 982 executes instructions, codes, computer programs, scripts which it accesses from hard disk, floppy disk, optical disk (these various disk based systems may all be considered secondary storage 984), ROM 986, RAM 988, or the network connectivity devices 992. While only one processor 982 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 984, for example, hard drives, floppy disks, optical disks, and/or other device, the ROM 986, and/or the RAM 988 may be referred to in some contexts as non-transitory instructions and/or non-transitory information.

In an embodiment, the computer system 980 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 980 to provide the functionality of a number of servers that is not directly bound to the number of computers in the computer system 980. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 980, at least portions of the contents of the computer program product to the secondary storage 984, to the ROM 986, to the RAM 988, and/or to other non-volatile memory and volatile memory of the computer system 980. The processor 982 may process the executable instructions and/or data structures in part by directly accessing the computer program product, for example by reading from a CD-ROM disk inserted into a disk drive peripheral of the computer system 980. Alternatively, the processor 982 may process the executable instructions and/or data structures by remotely accessing the computer program product, for example by downloading the executable instructions and/or data structures from a remote server through the network connectivity devices 992. The computer program product may comprise instructions that promote the loading and/or copying of data, data structures, files, and/or executable instructions to the secondary storage 984, to the ROM 986, to the RAM 988, and/or to other non-volatile memory and volatile memory of the computer system 980.

In some contexts, the secondary storage 984, the ROM 986, and the RAM 988 may be referred to as a non-transitory computer readable medium or a computer readable storage media. A dynamic RAM embodiment of the RAM 988, likewise, may be referred to as a non-transitory computer readable medium in that while the dynamic RAM receives electrical power and is operated in accordance with its design, for example during a period of time during which the computer 980 is turned on and operational, the dynamic RAM stores information that is written to it. Similarly, the processor 982 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for loading interface and applications packs on a mobile device, comprising:

transmitting, by an application stored in a non-transitory memory on a server and executable by a processor of the server, a core portion of an initial interface and applications pack to the mobile device via a wireless network, wherein the initial interface and applications pack replaces a default user interface on the mobile device with a user interface associated with the initial interface and applications pack, comprises at least three of a media file, an application, a web widget, and a network service, and is used to customize the communication experience of using the mobile device, wherein the core portion of the initial interface and applications pack comprises a self-installation routine and enables core communication functionality of the mobile device including at least one of enabling dialing, enabling wireless voice communications via the wireless network, enabling access to voice mail, and enabling access to emergency services before a remaining portion of the initial interface and applications pack has been transmitted to the mobile device, and wherein the user interface associated with the initial interface and applications pack comprises a plurality of icons corresponding to applications or services provided as part of the initial interface and applications pack, the plurality of icons including:
- a first viewable indicia indicating that an application or service corresponding to an unavailable icon is currently being downloaded to the mobile device,
- a second viewable indicia indicating, based on a threshold of usage by the mobile communication device, that an application or service corresponding to an available icon has been used more than the threshold of usage, and
- a third viewable indicia indicating, based on the threshold of usage, that an application or service corresponding to an available icon has been used less than the threshold of usage;

transmitting at least one additional bundle of the initial interface and applications pack to the mobile device via the wireless network after transmitting the core portion of the initial interface and applications pack, wherein the at least one additional bundle of the initial interface and applications pack comprises instructions executable by a processor of the mobile device for providing additional functionality to the mobile device;

storing a plurality of retail interface and applications packs in a content server, wherein each of the plurality of retail, interface and applications packs comprises at least three of a media file, an application, a web widget, and a network service associated with a retail outlet and comprises a self-installation routine to configure the mobile device; and selecting and transmitting a retail interface and applications pack of the plurality of retail interface and applications packs to the mobile device via the wireless network, wherein the retail interface and applications pack replaces the user interface associated with the initial user interface and applications pack with a user interface associated with the retail outlet.

2. The method of claim 1, wherein the core communication functionality further comprises at least one of enabling text messaging, enabling e-mail functionality, and enabling web access, enabling access to a social media web site.

3. The method of claim 1, wherein the additional bundle of the initial interface and applications pack provides additional functionality that comprises at least one of enabling text messaging, enabling e-mail functionality, enabling web access, and enabling access to a social media web site.

4. The method of claim 3, wherein enabling e-mail functionality comprises at least one of downloading e-mail, reading e-mail, composing e-mail, and sending e-mail.

5. The method of claim 1, further comprising pre-certifying, by a provider server, the retail interface and applications pack by testing each user application in the retail interface and applications pack and the self-installation routine to verify that the retail interface and applications pack interoperates with the mobile device.

6. A method for loading interface and applications packs on a mobile device, comprising:
receiving, by an application stored in a non-transitory memory of a mobile device and executable by a processor of the mobile device, an initial core bundle of an initial interface and applications pack from a telecommunications service provider via a wireless network, wherein the initial interface and applications pack replaces a default user interface on the mobile device with a user interface associated with the initial interface and applications pack, and comprises at least three of a media file, an application, a web widget, and a network service, and wherein the initial core bundle of the initial interface and applications pack comprises only a portion of the initial interface and applications pack including a file providing a user interface frame, identification of materials that are to be provided to the mobile device, and access to core functionalities including at least one of enabling dialing, enabling wireless voice communications via the wireless network, enabling access to voice mail, and enabling access to emergency services;

installing, by the application, the initial core bundle of the initial interface and applications pack to the mobile device;

generating, by the application, and displaying on a display a user interface from the initial core bundle, wherein the user interface comprises a plurality of icons corresponding to applications or services provided as part of the initial core bundle, the plurality of icons including:
- a first viewable indicia indicating that an application or service corresponding to an unavailable icon currently being downloaded to the mobile device,
- a second viewable indicia indicating, based on a threshold of usage by the mobile communication device, that an application or service corresponding to an available icon has been used more than the threshold of usage, and
- a third viewable indicia indicating, based on the threshold of usage, that an application or service corresponding to an available icon has been used less than the threshold of usage;

receiving, by the application, additional bundles of the initial interface and applications pack from the telecommunications service provider via the wireless network;

installing, by the application, the additional bundles of the initial interface and applications pack;

modifying, by the application, the user interface to reflect the installation of additional materials, wherein the displaying on the display the user interface from the initial core bundle is performed before the installation of the additional bundles of the initial interface and applications pack is complete;

receiving, by the application, a retail interface and applications pack of a plurality of retail interface and applications packs from a content server, wherein each retail interface and applications pack comprises at least three of a media file, an application, a web widget, and a network service associated with a retail outlet and comprises a self-installation routine to configure the mobile device; and installing, by the application, the retail interface and applications pack to the mobile device, wherein the retail interface and applications pack replaces the user interface associated with the initial user interface and applications pack with a user interface associated with the retail outlet.

7. The method of claim 6, wherein the viewable indicia of the unavailable icon comprises at least one of greying-out the unavailable icon, highlighting the unavailable icon, coloring the unavailable icon in a different manner from icons associated with features that are available, animating the unavailable icon, or flashing the unavailable icon.

8. A mobile device, comprising:
a display; and
a processor coupled to the display and configured to:
  receive an initial core bundle of an initial interface and applications pack via a wireless network, wherein the initial interface and applications pack comprises at least three of a media file, an application, a web widget, and a network service and a self-installation routine, and wherein the initial core bundle of the initial interface and applications pack comprises only a portion of the initial interface and applications pack and enables core communication functionality of the mobile device including at least one of enabling dialing, enabling wireless voice communications via the wireless network, enabling access to voice mail, and enabling access to emergency services,
  install the initial core bundle of the initial interface and applications pack to the mobile device,
  generate and display a user interface on the display based on the initial interface and applications pack that replaces a default user interface of the mobile device,
    wherein the user interface comprises a plurality of icons including an available icon, an available icon that has been used less than a threshold amount, and an unavailable icon, each icon corresponding to an application or a service provided as part of the initial interface and applications pack, and
    wherein the available icon comprises a viewable indicia indicating that an application or service corresponding to the available icon is currently available for use by the mobile device, the available icon that has been used less than the threshold amount comprises a viewable indicia indicating that an application or service corresponding to the available icon that has been used less than the threshold amount is currently available for use by the mobile device and has been used less than the threshold amount, and the unavailable icon comprises a viewable indicia indicating that an application or service corresponding to the unavailable icon is currently being downloaded to the mobile device,
  receive at least one additional bundle of the initial interface and applications pack via the wireless network after receiving the core portion,
  install the at least one additional bundle of the initial interface and applications pack,
  modify the user interface to reflect the installation of additional materials, wherein the displaying on the display the user interface from the initial core bundle is performed before the installation of the additional bundles of the initial interface and applications pack is complete,
  receive a retail interface and applications pack of a plurality of retail interface applications packs from a content server, wherein each retail interface and applications pack comprises at least three of a media file, an application, a web widget, and a network service associated with a retail outlet and comprises a self-installation routine to configure the mobile device,
  install the retail interface and applications pack to the mobile device, and
  generate and display a retail user interface associated with the retail outlet on the display based on the retail interface and applications pack, wherein the retail user interface replaces the user interface of the mobile device associated with the initial interface and applications pack.

9. The mobile device of claim 8, wherein the threshold amount comprises any amount of use, and wherein the available icon that has been used less than the threshold amount comprises a viewable indicia indicating that the application or service corresponding to the available icon that has been used less than the threshold amount has not been used.

10. The mobile device of claim 8, wherein the available icon comprises a viewable indicia indicating that the application or service corresponding to the available icon has been used infrequently.

11. The mobile device of claim 8, wherein the available icon comprises a viewable indicia indicating that the application or service corresponding to the available icon has been used frequently.

12. The mobile device of claim 8, wherein at least one of the plurality of icons comprises at least one of a picture and text.

13. The mobile device of claim 8, wherein the viewable indicia indicating that the application or service corresponding to the unavailable icon is currently being downloaded to the mobile device comprises at least one of greying-out the unavailable icon, highlighting the unavailable icon, coloring the unavailable icon in a different manner from icons associated with features that are available, animating the unavailable icon, or flashing the unavailable icon.

14. The mobile device of claim 8, wherein the mobile device is one of a smart phone and a tablet computer.

15. The mobile device of claim 8, wherein selection of one of the plurality of icons by a user invokes the application or the service associated with the selected one of the plurality of icons.

* * * * *